United States Patent
Asai

(10) Patent No.: US 8,848,246 B2
(45) Date of Patent: Sep. 30, 2014

(54) IMAGE DATA GENERATION METHOD, IMAGE RECORDING METHOD, IMAGE DATA GENERATION APPARATUS, AND IMAGE RECORDING APPARATUS

(71) Applicant: Dainippon Screen Mfg. Co., Ltd, Kyoto (JP)

(72) Inventor: Hiroshi Asai, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 13/922,174

(22) Filed: Jun. 19, 2013

(65) Prior Publication Data
US 2013/0335780 A1 Dec. 19, 2013

(30) Foreign Application Priority Data

Jun. 19, 2012 (JP) ................................. 2012-138137

(51) Int. Cl.
| | |
|---|---|
| *G06K 15/00* | (2006.01) |
| *H04N 1/405* | (2006.01) |
| *B41J 2/385* | (2006.01) |
| *G03G 13/04* | (2006.01) |
| *G06K 15/02* | (2006.01) |
| *H04N 1/52* | (2006.01) |

(52) U.S. Cl.
CPC .......... *G06K 15/1881* (2013.01); *H04N 1/4055* (2013.01); *H04N 1/52* (2013.01)
USPC ........... 358/2.1; 358/3.06; 358/3.09; 347/131

(58) Field of Classification Search
USPC ................. 358/3.03–3.09, 3.1, 3.3, 534–536; 347/131
See application file for complete search history.

(56) References Cited

U.S. PATENT DOCUMENTS

| | | | |
|---|---|---|---|
| 5,949,965 A | 9/1999 | Gondek | |
| 7,965,418 B2 * | 6/2011 | Yamada et al. | 358/3.05 |
| 2003/0090728 A1 | 5/2003 | Schramm et al. | |
| 2008/0291500 A1* | 11/2008 | Asai | 358/3.06 |
| 2009/0080002 A1* | 3/2009 | Nakano et al. | 358/1.7 |

FOREIGN PATENT DOCUMENTS

| | | |
|---|---|---|
| JP | 11-010918 | 1/1999 |
| JP | 2000-354172 A | 12/2000 |
| JP | 2010-241052 A | 10/2010 |

* cited by examiner

*Primary Examiner* — Barbara Reinier
(74) *Attorney, Agent, or Firm* — McDermott Will & Emery LLP

(57) ABSTRACT

An image recording apparatus generates black, cyan, magenta, and yellow halftone image data from a multi-tone color image. When the cyan halftone image data is generated, the size of a cyan dot to be formed at a target pixel position is provisionally determined and added to the size of a black dot to obtain a total dot size. When the total dot size is less than or equal to a first threshold dot size, the cyan dot size is determined to be the provisionally determined size, and when the total dot size is greater than the first threshold dot size, the cyan dot size is determined to be the largest dot size within the range of a difference between the first threshold dot size and the black dot size. It is possible to prevent excessive overlapping of black and cyan dots.

25 Claims, 17 Drawing Sheets

IMAGE DATA GENERATION METHOD, IMAGE RECORDING METHOD, IMAGE DATA GENERATION APPARATUS, AND IMAGE RECORDING APPARATUS

TECHNICAL FIELD

The present invention relates to an image data generation method and apparatus for generating halftone image data through halftone processing on a multi-tone color image and an image recording method and apparatus for recording an image onto a recording medium.

BACKGROUND ART

Image recording apparatuses for recording color images onto recording media using an inkjet system by moving an ejection part relative to the recording media have conventionally been used, the ejection part including a plurality of nozzles each ejecting fine droplets of ink. Color images are recorded by forming ink dots at each pixel position on a recording medium on the basis of halftone image data generated through halftone processing. Such image recording apparatuses, however, may cause poor color reproduction due to colors becoming dull or cockling (phenomenon where the surface of a recording medium becomes rippled) as a result of dots of multiple color inks greatly overlapping at each pixel position on a recording medium.

Meanwhile, Japanese Patent Application Laid-Open Nos. 11-010918 (Document 1) and 2000-354172 (Document 2) disclose methods for reducing graininess of images by recording only a dot of a single color at each pixel position. In Japanese Patent Application Laid-Open No. 2010-241052 (Document 3), halftone processing is performed on a color image on the basis of an evaluation index that indicates the degree of dispersion of the overlapping of dots on a recording medium. Through this, it is possible to suppress the overlapping of dots and reduce graininess of images.

Although Documents 1 and 2 can suppress dulling of color due to overlapping of multiple color dots, it becomes difficult to represent dark mixed colors. In addition, if ink landing positions shift from their desired positions and change the overlapping state of multiple color dots, the influence of that change is greatly reflected in coloration. Document 3 can also suppress dulling of color due to overlapping of multiple color dots, but it gives no consideration to the total amount of ink applied to each pixel position. It is thus difficult to appropriately suppress cockling.

SUMMARY OF INVENTION

The present invention is intended for an image data generation method of generating halftone image data through halftone processing on a multi-tone color image, and it is an object of the present invention to prevent dots of coloring materials of a plurality of colors from excessively overlapping one another when an image is recorded and to thereby suppress poor color reproduction and cockling.

An image data generation method according to the present invention includes a) generating first halftone image data by performing halftone processing on a first color component image that is an image of a first color component of the color image, the first halftone image data indicating sizes of a plurality of dots of the first color component that are respectively to be formed at a plurality of pixel positions arranged in a matrix in a halftone image region, and b) after the operation a), generating second halftone image data by performing halftone processing on a second color component image with reference to the first halftone image data, the second color component image being an image of a second color component of the color image, and the second halftone image data indicating sizes of a plurality of dots of the second color component that are respectively to be formed at the plurality of pixel positions in the halftone image region. The operation b) includes b1) performing halftone processing on one pixel in the second color component image and provisionally determining a size of a dot of the second color component that is to be formed at a pixel position corresponding to the one pixel among the plurality of pixel positions, b2) obtaining a total dot size that is a sum of a first dot size and a provisional second dot size, the first dot size being a size of a dot of the first color component that is formed at the pixel position, and the provisional second dot size being the size of the dot of the second color component and being provisionally determined in the operation b1), b3) comparing the total dot size with a predetermined threshold dot size, and when the total dot size is less than or equal to the threshold dot size, determining a second dot size to be the provisional second dot size, the second dot size being the size of the dot of the second color component, and when the total dot size is greater than the threshold dot size, determining the second dot size to be a largest dot size within a range of a difference between the threshold dot size and the first dot size, b4) when the total dot size is greater than the threshold dot size in the operation b3), changing a pixel value of a group of neighboring pixels located at one or more pixel positions at which the second dot size has not yet been determined among pixel positions around the one pixel, on the basis of a pixel value of the one pixel and a difference between the provisional second dot size and the second dot size, and b5) changing the one pixel to a next pixel in accordance with a predetermined processing order of the plurality of pixel positions and repeating the operations b1) to b4). The image data generation method can prevent dots of coloring materials of a plurality of colors from excessively overlapping one another when an image is recorded and thereby suppress poor color reproduction and cockling.

In a preferred embodiment of the present invention, the operations b1) to b4) are performed in sequential order from a pixel position at one end to a pixel position at the other end in a row or column of pixel positions in the halftone image region.

In another preferred embodiment of the present invention, in the operation b1), the provisional second dot size is determined by comparing the pixel value of the one pixel with a threshold value that is set for the pixel position, and in the operation b), the threshold value is changed during repetition of the operations b1) to b4).

In yet another preferred embodiment of the present invention, the image data generation method further includes c) after the operation b), generating third halftone image data by performing halftone processing on a third color component image with reference to the first halftone image data and the second halftone image data, the third color component image being an image of a third color component of the color image, and the third color component image indicating sizes of a plurality of dots of the third color component that are respectively to be formed at the plurality of pixel positions in the halftone image region. The operation c) includes c1) performing halftone processing on one pixel in the third color component image and provisionally determining a size of a dot of the third color component that is to be formed at a pixel position corresponding to the one pixel among the plurality of pixel positions, c2) obtaining another total dot size that is a sum of the first dot size, the second dot size, and a provisional third dot size at the pixel position, the provisional third dot size being the size of the dot of the third color component and being provisionally determined in the operation c1), c3) comparing the other total dot size with another threshold dot size, and when the other total dot size is less than or equal to the other threshold dot size, determining a third dot size to be the provisional third dot size, the third dot size being the size of the dot of the third color component, and when the other total dot size is greater than the other threshold dot size, determining the third dot size to be a largest dot size within a range of a difference between the other threshold dot size and a sum of the first dot size and the second dot size as the third dot size, c4) when the other total dot size is greater than the other threshold dot size in the operation c3), changing a pixel value of a group of neighboring pixels located at one or more pixel positions at which the third dot size has not yet been determined among pixel positions around the one pixel, on the basis of a pixel value of the one pixel and a difference between the provisional third dot size and the third dot size, and c5) changing the one pixel to a next pixel in accordance with a predetermined processing order of the plurality of pixel positions and repeating the operations c1) to c4).

Another image data generation method according to the present invention includes a) generating first halftone image data by performing halftone processing on a first color component image that is an image of a first color component of the color image, the first halftone image data indicating sizes of a plurality of dots of the first color component that are respectively to be formed at a plurality of pixel positions arranged in a matrix in a halftone image region, and b) after the operation a), generating second halftone image data by performing halftone processing on a second color component image with reference to the first halftone image data, the second color component image being an image of a second color component of the color image, and the second halftone image data indicating sizes of a plurality of dots of the second color component that are respectively to be formed at the plurality of pixel positions in the halftone image region. The operation b) includes b1) performing halftone processing on the second color component image and provisionally determining sizes of a plurality of dots of the second color component that are respectively to be formed at the plurality of positions in the halftone image region, b2) obtaining a total dot size that is a sum of a first dot size and a provisional second dot size, the first dot size being a size of a dot of the first color component that is formed at a pixel position corresponding to one pixel in the second color component image among the plurality of pixel positions, and the provisional second dot size being a size of a dot of the second color component that is to be formed at the pixel position and being provisionally determined in the operation b1), b3) comparing the total dot size with a predetermined threshold dot size, and when the total dot size is less than or equal to the threshold dot size, determining a second dot size to be the provisional second dot size, the second dot size being the size of the dot of the second color component, and when the total dot size is greater than the threshold dot size, determining the second dot size to be a largest dot size within a range of a difference between the threshold dot size and the first dot size, b4) when the total dot size is greater than the threshold dot size in the operation b3), changing a provisional second dot size of a group of neighboring pixels that are located at one or more pixel positions at which the second dot size has not yet been determined among pixel positions around the one pixel, on the basis of a difference between the provisional second dot size and the second dot size at the one pixel, and b5) changing the one pixel to a next pixel in accordance with a predetermined processing order of the plurality of pixel positions and repeating the operations b2) to b4).

In another preferred embodiment of the present invention, the image data generation method further includes prior to the operation a), generating a black image, a cyan image, a magenta image, and a yellow image by performing separation processing along with gray-component replacement on the color image.

In yet another preferred embodiment of the present invention, the image data generation method further includes, between the operations a) and b) reducing the threshold dot size at a pixel position that is adjacent to a pixel position at which a dot of the first color component is determined to be formed in the operation a).

The present invention is also intended for an image recording method of recording an image onto a recording medium. The image recording method includes preparing first halftone image data and second halftone image data that are generated using a predetermined image data generation method, recording a dot on a recording medium on the basis of the first halftone image data, and recording a dot on a recording medium on the basis of the second halftone image data.

The present invention is also intended for an image data generation apparatus for generating halftone image data through halftone processing on a multi-tone color image. The image data generation apparatus includes a first halftone image data generation part for generating first halftone image data by performing halftone processing on a first color component image that is an image of a first color component of the color image, the first halftone image data indicating sizes of a plurality of dots of the first color component that are respectively to be formed at a plurality of pixel positions arranged in a matrix in a halftone image region, and a second halftone image data generation part for, after the first halftone image data is generated, generating second halftone image data by performing halftone processing on a second color component image with reference to the first halftone image data, the second color component image being an image of a second color component of the color image, and the second halftone image data indicating sizes of a plurality of dots of the second color component that are respectively to be formed at the plurality of pixel positions in the halftone image region. The second halftone image data generation part includes a provisional size determination part for performing halftone processing on one pixel in the second color component image and provisionally determining a size of a dot of the second color component that is to be formed at a pixel position corresponding to the one pixel among the plurality of pixel positions, a dot size totaling part for obtaining a total dot size that is a sum of a first dot size and a provisional second dot size, the first dot size being a size of a dot of the first color component that is formed at the pixel position, and the provisional second dot size being the size of the dot of the second color component and being provisionally determined by the provisional size determination part, a size determination part for comparing the total dot size with a predetermined threshold dot size, and when the total dot size is less than or equal to the threshold dot size, determining a second dot size to be the provisional second dot size, the second dot size being a size of a dot of the second color component, and when the total dot size is greater than the threshold dot size, determining the second dot sizes to be a largest dot size within a range of a difference between the threshold dot size and the first dot size as the second dot size, a pixel value changing part for, when the total dot size is greater than the threshold dot size, changing a pixel value of a group of neighboring pixels located at one or more pixel positions at which the second dot size has not yet been determined among pixel positions around the one pixel, on the basis of a pixel value of the one pixel and a difference between the provisional second dot size and the second dot size, and a repetition control part for changing the one pixel to a next pixel in accordance with a predetermined processing order of the plurality of pixel positions and repeating determination of the provisional second dot size by the provisional size determination part, calculation of the total dot size by the dot size totaling part, determination of the second dot size by the size determination part, and changing of the pixel value by the pixel value changing part.

Another image data generation apparatus according to the present invention includes a first halftone image data generation part for generating first halftone image data by performing halftone processing on a first color component image that is an image of a first color component of the color image, the first halftone image data indicating sizes of a plurality of dots of the first color component that are respectively to be formed at a plurality of pixel positions arranged in a matrix in a halftone image region, and a second halftone image data generation part for, after the first halftone image data is generated, generating second halftone image data by performing halftone processing on a second color component image with reference to the first halftone image data, the second color component image being an image of a second color component of the color image, and the second halftone image data indicating sizes of a plurality of dots of the second color component that are respectively to be formed at the plurality of pixel positions in the halftone image region. The second halftone image data generation part includes a provisional size determination part for performing halftone processing on the second color component image and provisionally determining the sizes of the plurality of dots of the second color component that are respectively to be formed at the plurality of pixel positions in the halftone image region, a dot size totaling part for obtaining a total dot size that is a sum of a first dot size and a provisional second dot size, the first dot size being a size of a dot of the first color component that is formed at a pixel position corresponding to one pixel in the second color component image among the plurality of pixel positions, and the provisional second dot size being a size of a dot of the second color component that is to be formed at the pixel position and being provisionally determined by the provisional size determination part, a size determination part for comparing the total dot size with a predetermined threshold dot size, and when the total dot size is less than or equal to the threshold dot size, determining a second dot size to be the provisional second dot size, the second dot size being is the size of the dot of the second color component, and when the total dot size is greater than the threshold dot size, determining the second dot size to be a largest dot size within a range of a difference between the threshold dot size and the first dot size as the second dot size, a provisional size changing part for, when the total dot size is greater than the threshold dot size, changing a second provision dot size of a group of neighboring pixels located at one or more pixel positions at which the second dot size has not yet been determined among pixel positions around the one pixel, on the basis of a difference between the provisional second dot size and the second dot size at the one pixel, and a repetition control part for changing the one pixel to a next pixel in accordance with a predetermined processing order of the plurality of pixel positions and repeating determination of the provisional second dot size by the provisional size determination part, calculation of the total dot size by the dot size totaling part, determination of the second dot size by the size determination part, and changing of the provisional second dot size by the provisional size changing part.

The present invention is also intended for an image recording apparatus for recording an image onto a recording medium. The image recording apparatus includes the aforementioned image data generation apparatus, a dot output element for recording a dot at a dot recording position of a recording medium, a movement mechanism for moving the dot recording position of the recording medium relative to the recording medium, and an output control part for controlling output of the dot output element on the basis of first halftone image data and second halftone image data in parallel with movement of the dot recording position of the recording medium relative to the recording medium, Preferably, the dot output element includes a first ejection part for ejecting a fine droplet of ink of the first color component onto the dot recording position of the recording medium to record a dot of the first color component, the first ejection part being controlled in accordance with the first halftone image data by the output control part, and a second ejection part for ejecting a fine droplet of ink of the second color component onto the dot recording position of the recording medium to record a dot of the second color component, the second ejection part being controlled in accordance with the second halftone image data by the output control part.

These and other objects, features, aspects and advantages of the present invention will become more apparent from the following detailed description of the present invention when taken in conjunction with the accompanying drawings.

DESCRIPTION OF EMBODIMENTS

Figure 1:
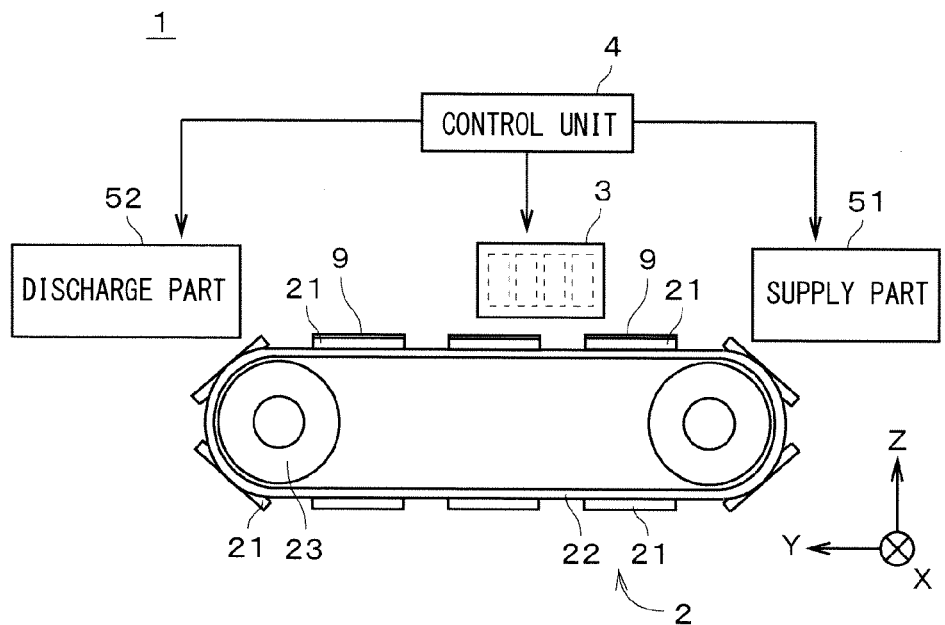
FIG. 1 illustrates a configuration of an image recording apparatus according to a first embodiment.

FIG. 1 illustrates a configuration of an image recording apparatus 1 according to a first embodiment of the present invention. The image recording apparatus 1 is a sheet-fed printing apparatus (so-called "inkjet printer") that sequentially records color images on a plurality of recording media 9, which is printing paper, by ejecting fine droplets of ink onto the recording media 9.

As illustrated in FIG. 1, the image recording apparatus 1 includes a movement mechanism 2 for moving the recording media 9 in a movement direction that is the +Y direction in FIG. 1, an ejection unit 3 that ejects fine droplets of ink toward the recording media 9 that are being conveyed by the movement mechanism 2, a supply part 51 that supplies the recording media 9 to the movement mechanism 2, a discharge part 52 that receives the printed recording media 9 from the movement mechanism 2, and a control part 4 that controls these mechanisms. The ejection unit 3 is disposed above the movement mechanism 2 (on the +Z side) and fixed to a frame (not shown).

The movement mechanism 2 includes a plurality of stages 21, an annular guide 22, and a belt driving mechanism 23. The stages 21 each suction and hold a sheet of recording medium 9. The guide 22 includes a belt to which the stages 21 are connected and guides the stages 21. The belt driving mechanism 23 moves the belt in the guide 22 counterclockwise in FIG. 1 so that the stages 21 on which the recording media 9 are held are moved in the +Y direction below the ejection unit 3 (i.e., on the −Z side).

Figure 2:
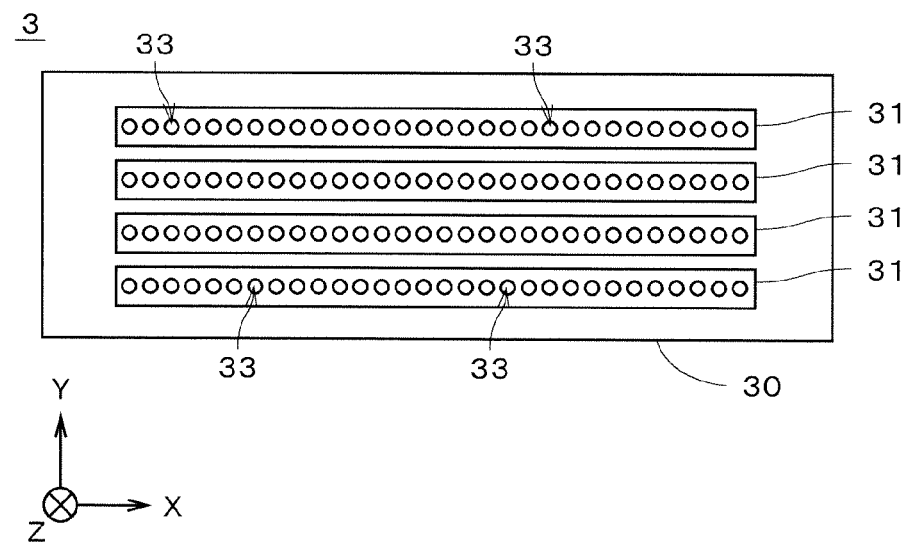
FIG. 2 is a bottom view of an ejection unit.

FIG. 2 is a bottom view of the ejection unit 3. The ejection unit 3 includes a plurality of (in the present embodiment, four) heads 31, each having the same structure and serving as an ejection part for ejecting ink of a different color toward the recording media 9. The heads 31 are arranged in the Y direction (i.e., movement direction) and attached to an attachment part 30 of the ejection unit 3. The heads 31 each have a plurality of outlets 33 arranged in the X direction perpendicular to the Y direction, which is the movement direction of the recording media 9. In FIG. 2, the number of outlets 33 illustrated is smaller than the actual number. Note that the outlets 33 do not necessarily have to be arranged in the X direction, and it is sufficient for the outlets 33 to be arranged in a direction intersecting with the Y direction.

The size of a fine droplet of ink ejected from each outlet 33 of each head 31 is switchable (i.e., each outlet 33 can eject fine droplets of different amounts). As a result of the size of the droplets being switched and those droplets landing on a recording medium 9, the size of the dots that are formed on the recording medium 9 is also switched. In the present embodiment, the size of a fine droplet of ink ejected from each head 31 is switched among three types, namely a "large size," a "medium size" smaller than the large size, and a "small size" smaller than the medium size. Thus, the size of an ink dot to be formed on the recording media 9 is switched among a "large size," a "medium size," a "small size," and a "zero size" that indicates the absence of a dot. In the following description, a large-sized dot, a medium-sized dot, and a small-sized dot are also respectively referred to as a "large dot," a "medium dot," and a "small dot." In the present embodiment, the amount of ink in a large-sized droplet is 9 pl (picoliters), the amount of ink in a medium-sized droplet is 6 pl, and the amount of ink in a small-sized droplet is 3 pl.

The head 31 on the most downstream side on the −Y side in FIG. 2 ejects black (K) ink, the head 31 on the +Y side of the black ink head 31 ejects cyan (C) ink, the head 31 on the +Y side of the cyan ink head 31 ejects magenta (M) ink, and the head 31 on the most upstream side on the +Y side ejects yellow (Y) ink. Note that the ejection unit 3 may also include inkjet heads or the like for other colors such as light cyan, light magenta, or white.

In the image recording apparatus 1, the heads 31 are each disposed across the entire recording area of a recording medium 9 in the X direction (in the present embodiment, across the entire width of the recording medium 9 in the X direction). An output control part 41 (see FIG. 3) of the control part 4 controls the ejection unit 3 and the movement mechanism 2. As a result of the recording medium 9 passing through positions facing the heads 31 of the ejection unit 3 only once, the ejection unit 3 sequentially ejects black, cyan, magenta, and yellow inks onto the recording medium 9, thus completing the recording of an image to a recording medium 9.

Figure 3:
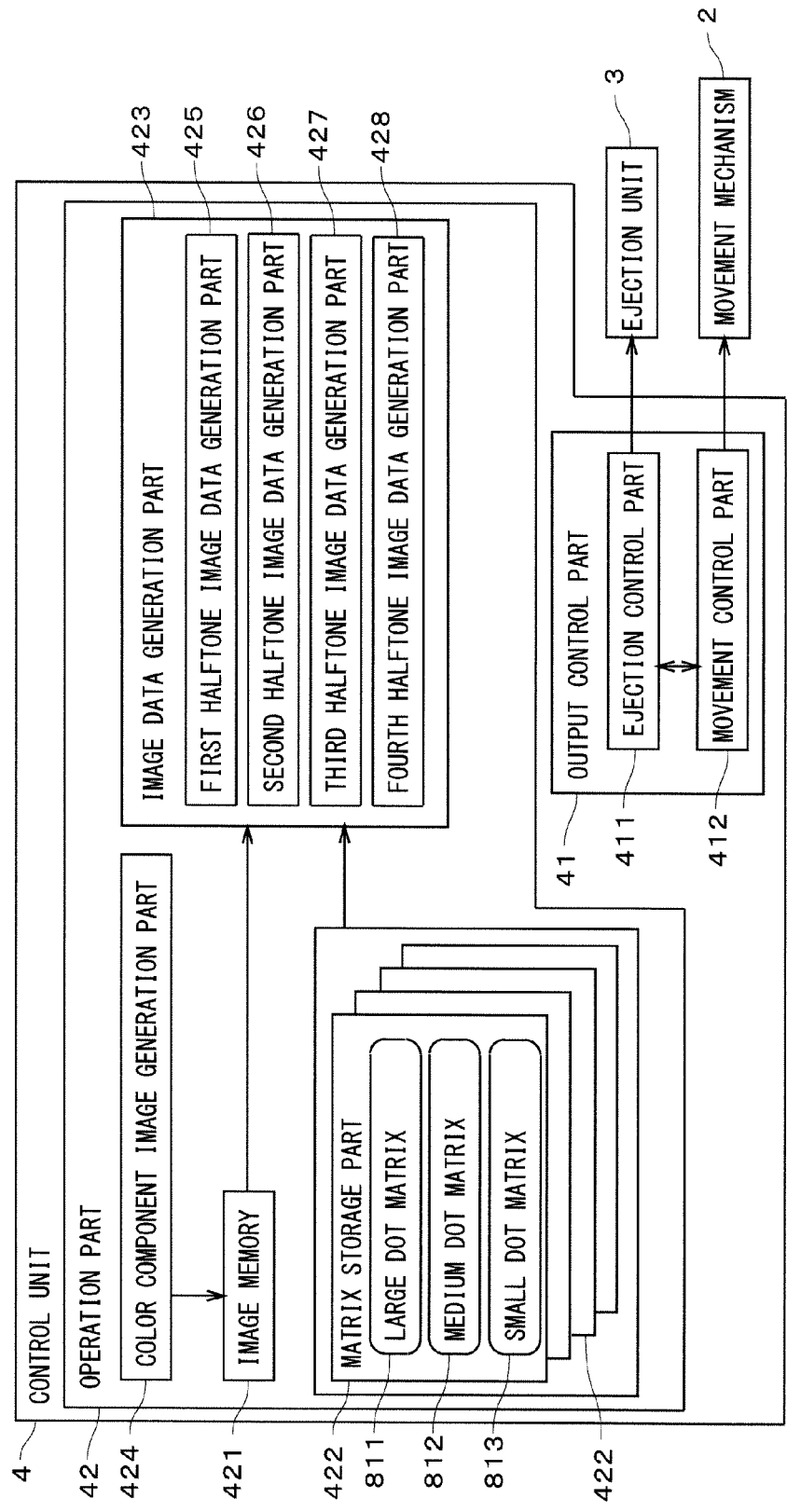
FIG. 3 is a block diagram illustrating the functions of a control unit.

In other words, the image recording apparatus 1 performs single-pass printing on the recording media 9. Specifically, the ejection unit 3 serving as a dot output element ejects fine droplets of ink from the outlets 33 of each head 31 to record dots at a plurality of dot recording positions that are arranged across the entire width of the recording medium 9 in a width direction perpendicular to the aforementioned movement direction, and the movement mechanism 2 moves the dot recording positions on the recording medium 9 only once in the aforementioned movement direction relative to the recording medium 9. Here, assuming that black is a first color, cyan is a second color, magenta is a third color, and yellow is a fourth color, the four heads 31 of the ejection unit 3 are respectively, in order from the −Y side, a first ejection part for recording dots of the first color, a second ejection part for recording dots of the second color, a third ejection part for recording dots of the third color, and a fourth ejection part for recording dots of the fourth color The control unit 4 is configured as a typical computer system in which a CPU that performs various types of computational processing, a ROM that stores a basic program, and a RAM that stores various types of information are connected to a bus line. FIG. 3 is a block diagram illustrating the functions of the control unit 4. FIG. 3 also illustrates part of the configuration of the image recording apparatus 1 connected to the control unit 4. The control unit 4 includes the aforementioned output control part 41 and an operation part 42 that performs various types of computations.

The operation part 42 includes an image memory 421, a plurality of matrix storage parts 422 (also, screen pattern memories (SPMs)), an image data generation part 423 (halftoning circuit), and a color component image generation part 424. The color component image generation part 424 performs separation processing along with gray-component replacement (GCR) on a multi-tone color image that is input from the outside. Gray component replacement refers to processing for representing gray portions, which are represented by superimposing black, cyan, magenta, and yellow dots, by only shades of black ink so that cyan, magenta, and yellow dots are not formed in the gray portions.

The above processing generates a tone image of black, which is a first color component of the color image, a tone image of cyan, which is a second color component, a tone image of magenta, which is a third color component, and a tone image of yellow, which is a fourth color component. In the following description, the black, cyan, magenta, and yellow tone images generated by the color component image generation part 424 are respectively referred to as a "first color component image," a "second color component image," a "third color component image," and a "fourth color component image." These first to fourth color component images are also collectively referred to as a "color component image."

Data regarding the first to fourth color component images (hereinafter, also collectively referred to as "color component image data") is stored in the image memory 421. The matrix storage parts 422 are memories that respectively store threshold matrices corresponding to the first to fourth color components.

The matrix storage parts 422 each store a large dot matrix 811 that is a threshold matrix for large dots, a medium dot matrix 812 that is a threshold matrix for medium dots, and a small dot matrix 813 that is a threshold matrix for small dots. The large dot matrix 811, the medium dot matrix 812, and the small dot matrix 813 are each a threshold matrix used in frequency modulated (FM) screening in which tones are represented by changing the number of randomly arranged dots.

Although FIG. 3 illustrates only the large dot matrix 811, the medium dot matrix 812, and the small dot matrix 813 stored in one of the matrix storage parts 422, the matrix storage parts 422 for the other color components each also store a large dot matrix 811, a medium dot matrix 812, and a small dot matrix 813. In the following description, these three threshold matrices, namely, the large dot matrix 811, the medium dot matrix 812, and the small dot matrix 813, are also collectively referred to as a "matrix set." Regarding the same position in the three threshold matrices, the threshold value in the large dot matrix 811 is the greatest and the threshold value in the small dot matrix 813 is the smallest. The threshold value in the medium dot matrix 812 is between the threshold value in the large dot matrix 811 and the threshold value in the small dot matrix 813.

Figure 4:
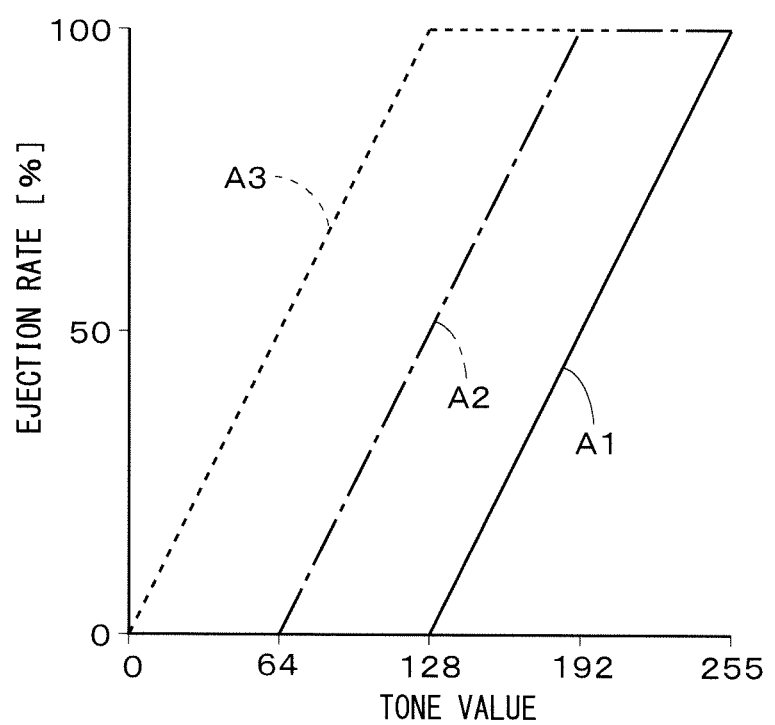
FIG. 4 illustrates characteristics of a matrix set.

FIG. 4 illustrates characteristics of a matrix set. In FIG. 4, the vertical axis indicates the ejection rate of ink of each color component when an image having a uniform tone value is recorded by the image recording apparatus 1, and the horizontal axis indicates the tone value of an image of each color component. The aforementioned ejection rate is a value indicating the proportion of the number of dots actually formed per unit area on a recording medium 9 by ink ejected from one of the heads 31 relative to a reference number of dots that is the number of recording positions defined as ink-dot formable positions in the unit area.

In FIG. 4, the ejection rate of large-sized fine droplets of ink is indicated by a solid line A1. In the following description, the ejection rates of large-, medium-, and small-sized fine droplets of ink are respectively referred to as a "large dot ejection rate," a "medium dot ejection rate," and a "small dot ejection rate." In FIG. 4, a sum of the large dot ejection rate and the medium dot ejection rate is indicated by a dashed dotted line A2, and a total ejection rate that is an ejection rate of all the different sized fine droplets of ink is indicated by a broken line A3.

The threshold values in the large dot matrix 811 range from 128 to 254, the threshold values in the medium dot matrix 812 range from 64 to 191, and the threshold values in the small dot matrix 813 range from 0 to 127. As described previously, at the same position in the three matrices in a matrix set, the threshold value in the medium dot matrix 812 is greater than that in the small dot matrix 813, and the threshold value in the large dot matrix 811 is greater than that in the medium dot matrix 812. When a large dot is formed at one position, neither a small nor a medium dot is formed at that position even if the input pixel value exceeds the threshold values.

When a medium dot is formed at one position, a small dot is not formed at that position even if the input pixel value exceeds the threshold value.

As illustrated in FIG. 4, as the tone value in the image increases from 0 to 64, the ejection rate of only small dots linearly increases from 0% to 50% as indicated by the broken line A3. As the tone value increases from 64 to 128, the total ejection rate linearly increases from 50% to 100% as indicated by the broken line A3, and the medium-dot ejection rate linearly increases from 0% to 50% as indicated by the dashed dotted line A2. A difference between the broken line A3 and the dashed dotted line A2 corresponds to the small-dot ejection rate, and the small-dot ejection rate is constant irrespective of the increase in tone value.

When the tone value increases from 128 to 192, the total ejection rate remains at 100% as indicated by the broken line A3, the sum of the large-dot ejection rate and the medium-dot ejection rate linearly increases from 50% to 100% as indicated by the dashed dotted line A2, and the large-dot ejection rate linearly increases from 0% to 50% as indicated by the solid line A1. A difference between the broken line A3 and the dashed dotted line A2 corresponds to the small-dot ejection rate, and the small-dot ejection rate decreases with increasing tone value. A difference between the dashed dotted line A2 and the solid line A1 corresponds to the medium-dot ejection rate, and the medium-dot ejection rate is constant irrespective of the increase in tone value.

When the tone value increases from 192 to 255, the total ejection rate remains at 100%, and the sum of the large-dot ejection rate and the medium-dot ejection rate also remains at 100% as indicated by the dashed dotted line A2. The large-dot ejection rate linearly increases from 50% to 100% as indicated by the solid line A1. A difference between the dashed dotted line A2 and the solid line A1 corresponds to the medium-dot ejection rate, and the medium-dot ejection rate decreases with increasing tone value. The small-dot ejection rate is 0%, and thus small-sized fine droplets of ink are not ejected.

In the case of generating a threshold matrix corresponding to each dot size in a matrix set, a threshold matrix serving as a basis is created using, for example, a method disclosed in Japanese Patent Application Laid-Open No. 2008-199154, the disclosure of which is herein incorporated by reference, and an offset value is added to each threshold value so that the range of threshold values is narrowed as necessary and the minimum threshold value is suitable for tone values that appear in dots of that size.

The image data generation part 423 illustrated in FIG. 3 is a comparison part for comparing color component image data with a threshold matrix for each color component and generating halftone image data. The image data generation part 423 includes a first halftone image data generation part 425 for comparing the first color component image with a threshold matrix corresponding to the first color component, a second halftone image data generation part 426 for comparing the second color component image with a threshold matrix corresponding to the second color component, a third halftone image data generation part 427 for comparing the third color component image with a threshold matrix corresponding to the third color component, and a fourth halftone image data generation part 428 for comparing the fourth color component image with a threshold matrix corresponding to the fourth color component. Note that the image data generation part 423 may be implemented by software.

The output control part 41 includes an ejection control part 411 and a movement control part 412. The movement control part 412 controls the movement of the recording media 9 relative to the ejection unit 3 by the movement mechanism 2, on the basis of output from the operation part 42. The ejection control part 411 controls the ejection of ink from the outlets 33 of the ejection unit 3 in synchronization with the movement of the recording media 9 (i.e., controls output of the dot output element) on the basis of the output from the operation part 42.

Figure 5:
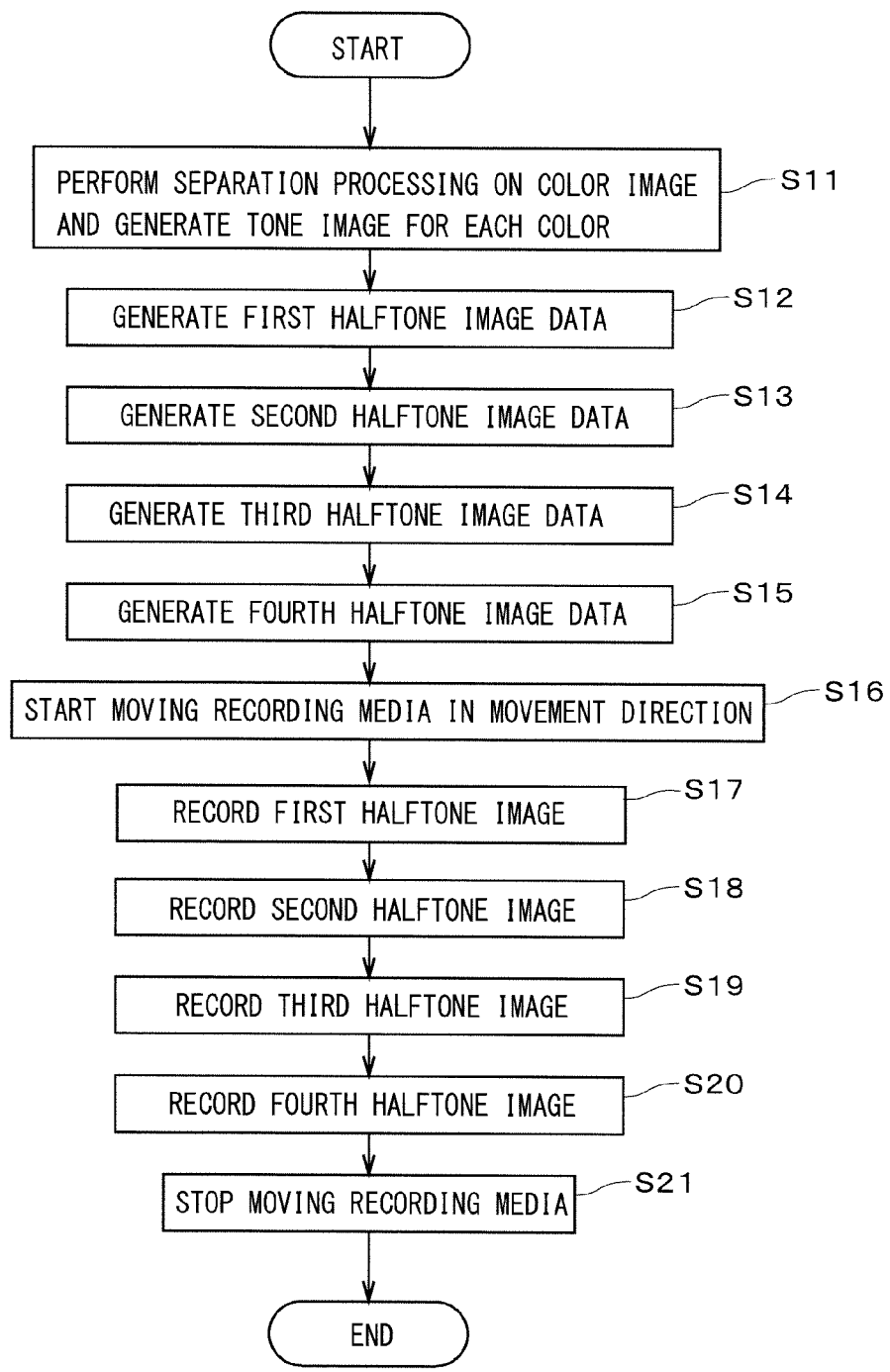
FIG. 5 illustrates the procedure of image recording performed by the image recording apparatus.

Next, the operation of the image recording apparatus 1 when recording an image will be described with reference to FIG. 5. FIG. 5 illustrates the procedure of image recording, focusing on a single recording medium 9. In the image recording apparatus 1, the four matrix sets used in halftoning of the first to fourth color component images are respectively stored in the four matrix storage parts 422 of the operation part 42 illustrated in FIG. 3. Also, data regarding a multi-tone color image is input from an external computer to the color component image generation part 424. The tone values for each color component of the color image (i.e., pixel values that can be taken by the pixels in each color component image) range from 0 to 255. A tone value 0 corresponds to a density of 0% and is represented by an ink dot not being formed. A tone value 255 corresponds to a density of 100% (solid color) and is represented by a large ink dot. Specifically, in the image recording apparatus 1, the amount of ink of a droplet corresponding to the density of 100% is 9 pl.

The present embodiment describes a case in which the color image is a tint image in which a black tone value is 143, a cyan tone value is 214, a magenta tone value is 189, and a yellow tone value is 10. The color component image generation part 424 performs separation processing along with gray-component replacement on the color image and thereby generates a black tone image having a tone value of 153 (density of 60%), a cyan tone image having a tone value of 204 (density of 80%) a magenta tone image having a tone value of 179 (density of 70%) and a yellow tone image having a tone value of 0 (density of 0%) (step S11). The color component images generated by the component image generation part 424 are each stored in the image memory 421.

Then, the first halftone image data generation part 425 compares the pixel value (in the present embodiment, 153) of each pixel in the black tone image, which is the first color component image, with a threshold value in the matrix set for black. Through this, halftone processing is performed on the black tone image (i.e., the black tone image is halftoned) to generate first halftone image data used in recording a black image (step S12).

Figure 6:
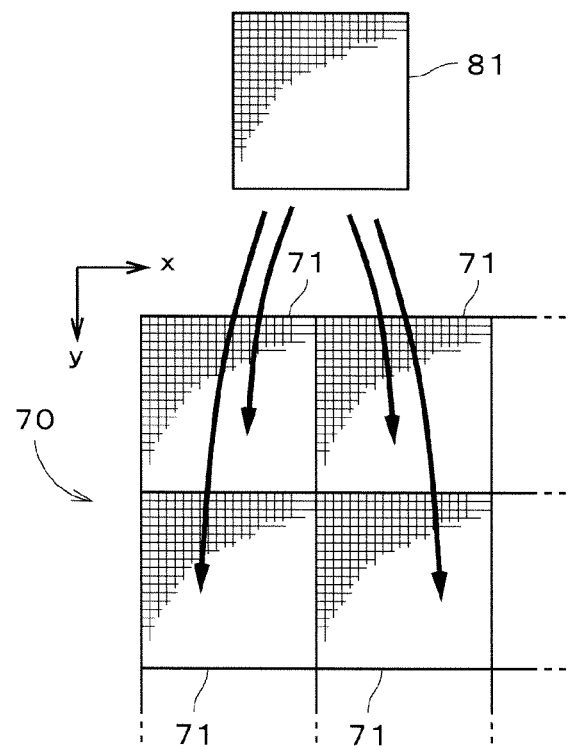
FIG. 6 illustrates a tone image and a threshold matrix.

Here, halftoning (generating halftone dots) of a tone image will be described. FIG. 6 is an abstract view of a tone image and a threshold matrix. In FIG. 6, one threshold matrix in a matrix set is indicated by reference numeral 81. The threshold matrix 81 has a plurality of elements arranged in row and column directions, the row direction corresponding to the width direction of the recording media 9 (indicated as the x direction in FIG. 6) and the column direction corresponding to the movement direction (indicated as the y direction in FIG. 6). The tone image 70 also has a plurality of pixels arranged in the row and column directions.

In the case of halftoning the tone image 70, the tone image 70 is divided into a large number of regions of the same size to set repetitive areas 71 that are units of halftoning as illustrated in FIG. 6. The matrix storage parts 422 in FIG. 3 each have a storage area corresponding to a single repetitive area 71 and store the threshold matrix 81 in which threshold values are set at each address (coordinates) in the storage area. Conceptually, each repetitive area 71 of the tone image 70 and the threshold matrix 81 are superimposed on each other, and the pixel value of each pixel in the repetitive area 71 is compared with a corresponding threshold value in the threshold matrix 81. The comparison between the pixel value and the threshold value is performed using the three threshold matrices corresponding to the three types of dot sizes (i.e., the large dot matrix 811, the medium dot matrix 812, and the small dot matrix 813). This determines whether or not to form a dot at that pixel position on a recording medium 9, and the size of the dot to be formed.

In the actual operation, the pixel value of one pixel in the tone image 70 is read out from the image memory 421 on the basis of an address signal from an address generator of the image data generation part 423 in FIG. 3. Meanwhile, the address generator generates an address signal indicating the position of that pixel in the repetitive area 71, and therefore three threshold values in the large dot matrix 811, the medium dot matrix 812, and the small dot matrix 813 are specified and read out from the matrix storage parts 422. The image data generation part 423 then compares the above pixel value with the three threshold values and sequentially determines the sizes of a plurality of dots to be formed at a plurality of pixel positions (i.e., a plurality of dot recording positions) arranged in a matrix in a halftone image region, which is a region in the output image.

Specifically, the pixel value of each pixel in the tone image 70 (hereinafter, an "input pixel value") is compared with a threshold value in the large dot matrix 811 at a pixel position corresponding to the pixel in the halftone image region, and when the input pixel value is greater than the threshold value, a value of "3" is assigned to that pixel position. Hereinafter, a value in the halftone image is referred to as a "halftone pixel value." When the input pixel value is less than or equal to the threshold value in the large dot matrix 811, the input pixel value is compared with a threshold value in the medium dot matrix 812. When the input pixel value is greater than the threshold value in the medium dot matrix 812, a halftone pixel value of "2" is assigned to the above pixel position. When the input pixel value is less than or equal to the threshold value in the medium dot matrix 812, the input pixel value is compared with a threshold value in the small dot matrix 813. When the input pixel value is greater than the threshold value in the small dot matrix 813, a halftone pixel value of "1" is assigned to the above pixel position, and when the input pixel value is less than or equal to the threshold value, a halftone pixel value of "0" is assigned to the above pixel position.

Figure 7:
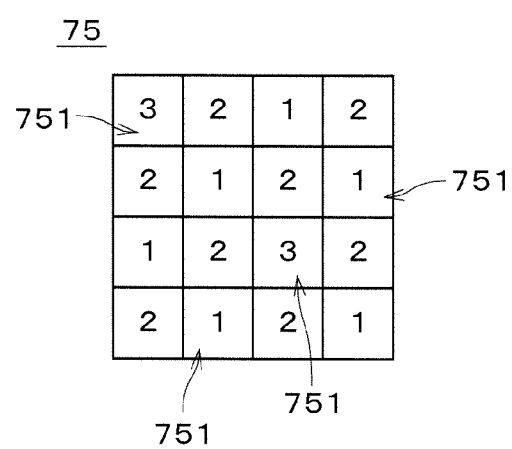
FIG. 7 is a simplified view of a halftone image region.

FIG. 7 is a simplified conceptual diagram of a halftone image region 75 where a halftone image is to be generated. In FIG. 7, the halftone image region 75 is illustrated as a square region in which four pixel positions 751 are arranged in rows and columns. Although the halftone image region 75 in FIG. 7 includes 16 pixel positions 751, an actual halftone image region 75 includes a larger number of pixel positions. In FIG. 7, the numerical value assigned to each pixel position 751 indicates a halftone pixel value in the first halftone image data.

As will be described later, a large-sized fine droplet of ink is ejected and a large dot is formed at a pixel position 751 (i.e., a dot recording position on a recording medium 9) having a halftone pixel value of "3" in the halftone image region 75. Also, a medium-sized fine droplet of ink is ejected and a medium dot is formed at a pixel position 751 having a halftone pixel value of "2," and a small-sized fine droplet of ink is ejected and a small dot is formed at a pixel position 751 having a halftone pixel value of "1." No dot is formed at a pixel position 751 having a halftone pixel value of "0." In other words, the dot size at that pixel position 751 is the zero size.

As described above, the first halftone image data generated by the first halftone image data generation part 425 in step S12 indicates the sizes of a plurality of black dots to be formed at a plurality of pixel positions 751 in the halftone image region 75. If the size of black dots is referred to as a "first dot size," the first dot size is one of a large size that is a largest size, medium and small sizes that are intermediate sizes smaller than the largest size, and a zero size.

When step S12 has ended, the second halftone image data generation part 426 illustrated in FIG. 3 performs halftone processing on the cyan tone image, which is the second color component image (i.e., the cyan tone image is halftoned), by comparing the pixel value (in the present embodiment, 204) of each pixel in the cyan tone image with a threshold value in the matrix set for cyan with reference to the first halftone image data. Through this, second halftone image data indicating the sizes of a plurality of cyan dots to be formed at the pixel positions in the halftone image region is generated (step S13). When the size of cyan dots is referred to as a "second dot size," the second dot size is one of a large size that is a largest size, medium and small sizes that are intermediate sizes smaller than the largest size, and a zero size, similarly to the first dot size.

Figure 8:
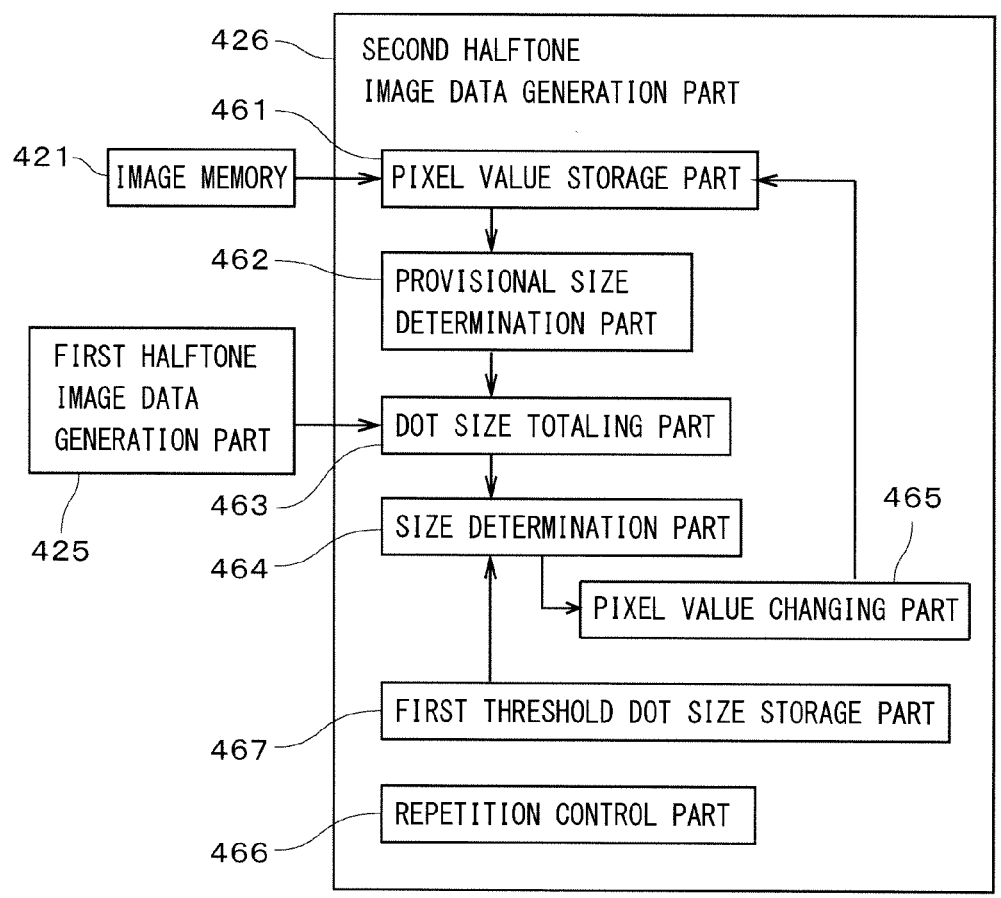
FIG. 8 is a block diagram illustrating the functions of a second halftone image data generation part.
Figure 9A:
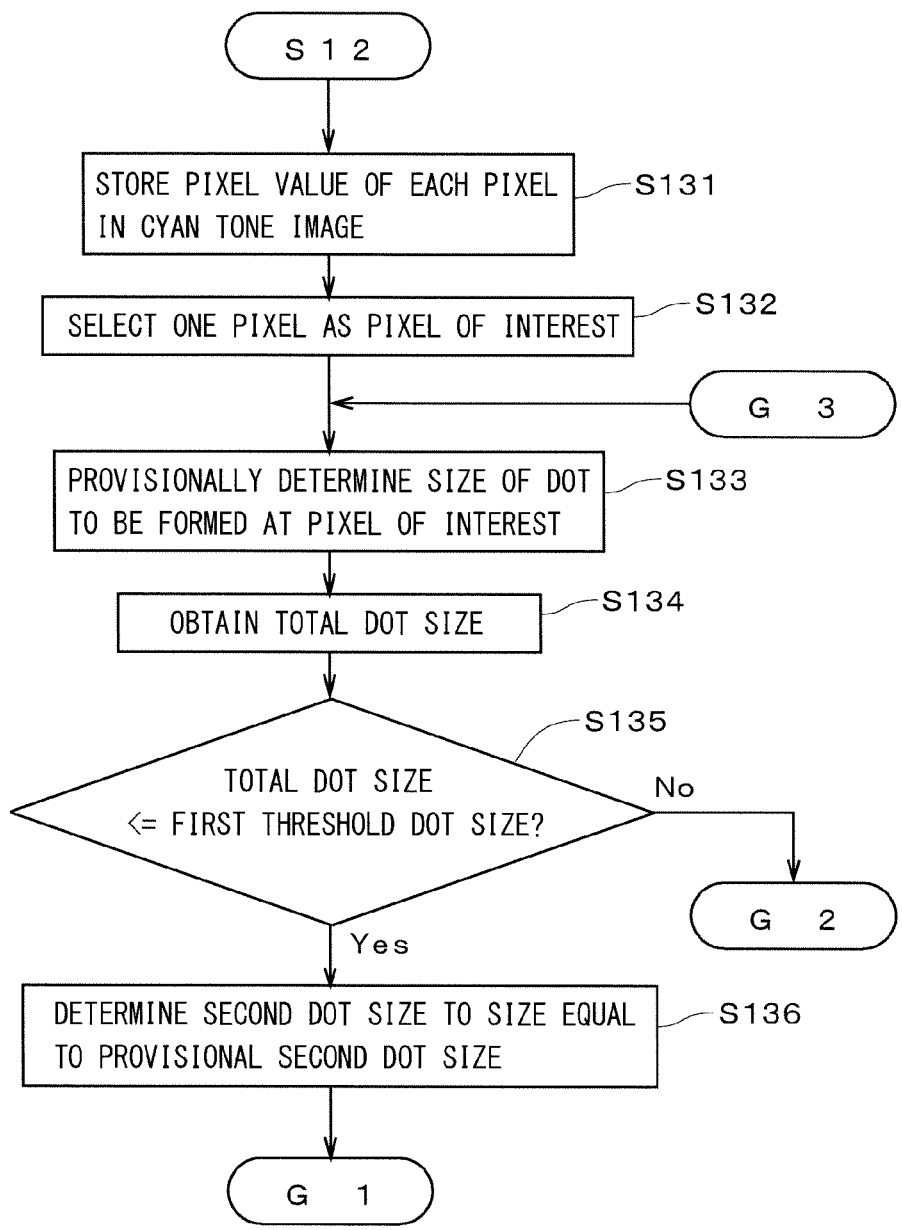
FIG. 9A illustrates part of the procedure of image recording.
Figure 9B:
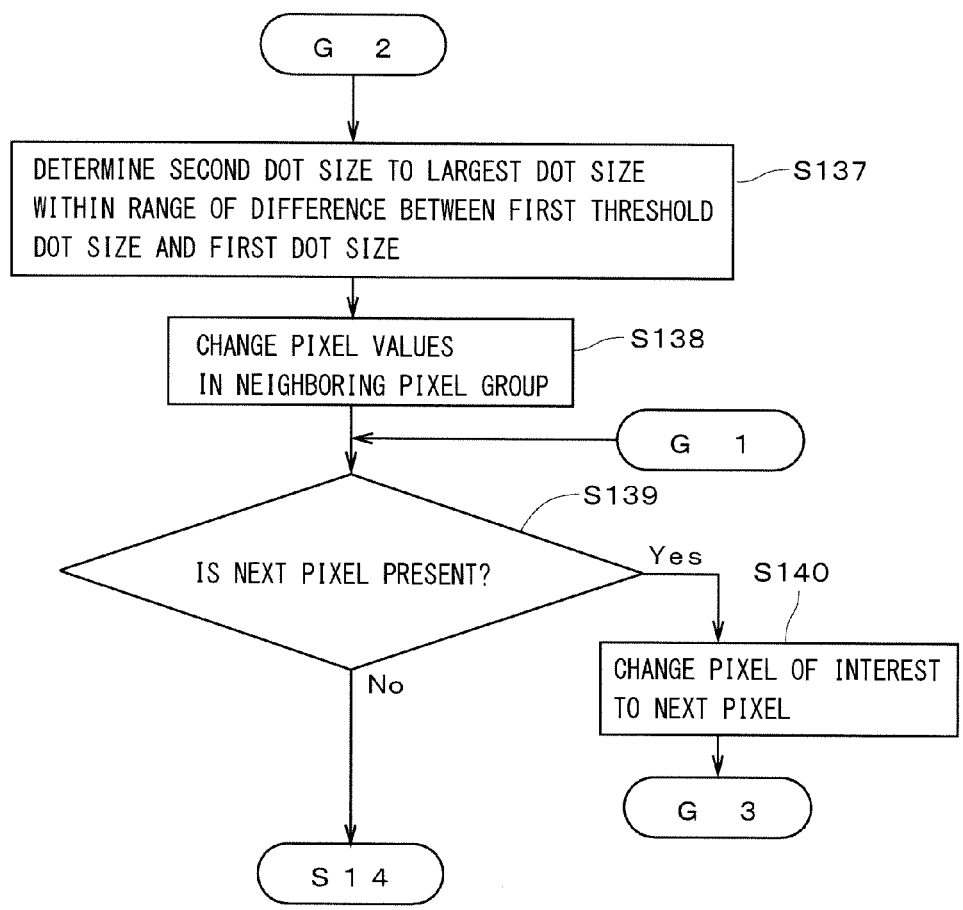
FIG. 9B illustrates part of the procedure of image recording.

FIG. 8 is a block diagram illustrating the functions of the second halftone image data generation part 426. FIGS. 9A and 9B illustrate a detailed procedure of step S13. As illustrated in FIG. 8, the second halftone image data generation part 426 includes a pixel value storage part 461, a provisional size determination part 462, a dot size totaling part 463, a size determination part 464, a pixel value changing part 465, a repetition control part 466, and a first threshold dot size storage part 467.

The first threshold dot size storage part 467 stores a first threshold dot size for use in generating the second halftone image data. The first threshold dot size indicates an upper-limit value for the sum of the dot sizes of black and cyan inks that are to be recorded on a single pixel. In the present embodiment, the first threshold dot size is a size corresponding to the sum of the large dot and the small dot. The amount of ink corresponding to that size is 12 pl, and the halftone pixel value corresponding to that size is "4." The first threshold dot size is also a size corresponding to the sum of the medium dot and the medium dot.

The second halftone image data generation part 426 reads the cyan tone image from the image memory 421 and stores the pixel value of each pixel in the pixel value storage part 461 (step S131). Then, one pixel in the cyan tone image is selected as a pixel of interest (step S132). In the present embodiment, a pixel at the pixel position 751 of the upper left corner of the halftone image region 75 illustrated in FIG. 7 is selected as a pixel of interest. Next, the provisional size determination part 462 performs halftone processing similar to that described above on the pixel of interest and provisionally determines the size of a cyan dot to be formed at a pixel position 751 corresponding to the pixel of interest (hereinafter, "target pixel position 751") in the halftone image region 75 (step S133).

Specifically, the pixel value of the pixel of interest is compared with a threshold value of the large dot matrix 811 for cyan at the target pixel position 751 in the halftone image region 75. When the pixel value of the pixel of interest is greater than the threshold value, a halftone pixel value of "3" is provisionally assigned to the target pixel position 751. In other words, the size of a cyan dot to be formed at the target pixel position 751 is provisionally determined to be the large size. When the pixel value of the pixel of interest is less than or equal to the threshold value in the large dot matrix 811, the pixel value of the pixel of interest is compared with a threshold value in the medium dot matrix 812 for cyan. When the pixel value of the pixel of interest is greater than the threshold value in the medium dot matrix 812, a halftone pixel value of "2" is provisionally assigned to the target pixel position 751, and the size of a cyan dot to be formed at the target pixel position 751 is provisionally determined to be the medium size.

When the pixel value of the pixel of interest is less than or equal to the threshold value in the medium dot matrix 812, the pixel value of the pixel of interest is compared with a threshold value in the small dot matrix 813 for cyan. When the pixel value of the pixel of interest is greater than the threshold value in the small dot matrix 813, a halftone pixel value of "1" is provisionally assigned to the target pixel position 751 and the size of a cyan dot to be formed at the target pixel position 751 is provisionally determined to be the small size. When the pixel value of the pixel of interest is less than or equal to the threshold value in the small dot matrix 813, a halftone pixel value of "0" is provisionally assigned to the target pixel position 751 and the size of a cyan dot to be formed at the target pixel position 751 is provisionally determined to be the zero size.

When the provisional determination of the dot size has ended, the dot size totaling part 463 acquires a first dot size from the first halftone image data generation part 425, the first size being the size of a black dot formed at the target pixel position 751 in the halftone image region 75. As illustrated in FIG. 7, the halftone pixel value for black at the target pixel position 751 is "3" and therefore the first dot size is a large size. The dot size totaling part 463 then obtains a total dot size that is the sum of the above first dot size and a provisional second dot size at the target pixel position 751, the provisional second dot size being the size of a cyan dot provisionally determined in step S133 (step S134).

Then, the size determination part 464 compares the total dot size with the first threshold dot size that is stored in advance in the first threshold dot size storage part 467 (step S135). Specifically, the amount of ink (12 pl) corresponding to the first threshold dot size and the amount of ink corresponding to the total dot size are compared, and when the amount of ink corresponding to the total dot size is less than or equal to 12 pl, it is determined that the total dot size is less than or equal to the first threshold dot size. When the amount of ink corresponding to the total dot size is greater than 12 pl, it is determined that the total dot size is greater than the first threshold dot size.

The comparison between the total dot size and the first threshold dot size may be made by comparing the halftone pixel value (i.e., 4) corresponding to the first threshold dot size and a halftone pixel value corresponding to the total dot size (i.e., the sum of the halftone pixel values for black and cyan at the target pixel position 751).

In this case, when the halftone pixel value corresponding to the total dot size is "4" or less, it is determined that the total dot size is less than or equal to the first threshold dot size, and when the halftone pixel value corresponding to the total dot size is greater than "4," it is determined that the total dot size is greater than the first threshold dot size.

When the provisional second dot size is the zero size (the corresponding amount of ink is 0 pl), the total dot size is a size corresponding to the sum of the large size and the zero size, and the amount of ink corresponding to the total dot size is 9 pl.

It is thus determined that the total dot size is less than or equal to the first threshold dot size, and the size determination part 464 determines the second dot size, which is the size of a cyan dot to be formed at the target pixel position 751, to be the provisional second dot size, i.e., the zero size (step S136). Thus, a value of "0" is assigned as a halftone pixel value for cyan at the target pixel position 751.

When the provisional second dot size is the small size (the corresponding amount of ink is 3 pl), the total dot size is a size corresponding to the sum of the large size and the small size, and the amount of ink corresponding to the total dot size is 12 pl. It is thus determined that the total dot size is less than or equal to the first threshold dot size as described above, and the size determination part 464 determines the second dot size to be the small size, which is equal to the provisional second dot size (step S136). Thus, a value of "1" is assigned as a halftone pixel value for cyan at the target pixel position 751.

When the provisional second dot size is the medium size (the corresponding amount of ink is 6 pl), the total dot size is a size corresponding to the sum of a large size and a medium size, and the amount of ink corresponding to the total dot size is 15 pl. It is thus determined that the total dot size is greater than the first threshold dot size. Then, the size determination part 464 determines the second dot size to be the largest dot size within the range of a difference between the first threshold dot size and the first dot size, i.e., a small size (step S137). In terms of the amount of ink corresponding to the dot size, the second dot size is determined to be the small size, which is the largest dot size within the range of the difference (3 pl) between the amount of ink (12 pl) corresponding to the first threshold dot size and the amount of ink (9 pl) corresponding to the first dot size. Thus, a value of "1" is assigned as a halftone pixel value for cyan at the target pixel position 751.

When the provisional second dot size is the large size (the corresponding amount of ink is 9 pl), the total dot size is a size corresponding to the sum of the large size and the large size, and the amount of ink corresponding to the total dot size is 18 pl. It is thus determined that the total dot size is greater than the first threshold dot size as in the above case, and the size determination part 464 determines the second dot size to be the small size, which is the largest dot size within the range of a difference between the first threshold dot size and the first dot size (step S137). Thus, a value of "1" is assigned as a halftone pixel value for cyan at the target pixel position 751.

When it has been determined in step S135 that the total dot size is greater than the first threshold dot size, step S137 is followed by a step in which the pixel value changing part 465 accesses the cyan tone image stored in the pixel value storage part 461. The pixel value changing part 465 then changes the pixel values of pixels located at one or more pixel positions 751 (hereinafter, "neighboring pixel group") at which the second dot size has not yet been determined among pixel positions 751 around the pixel of interest in the cyan tone image, on the basis of the pixel value of the pixel of interest and the difference between the provisional second dot size and the second dot size at the target pixel position 751 (step S138).

Figure 10:
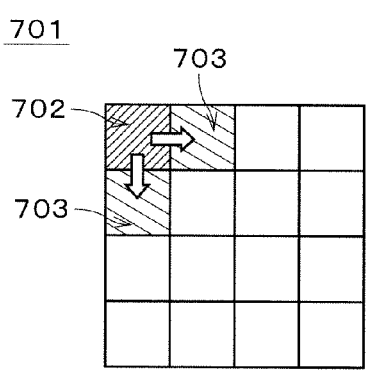
FIG. 10 illustrates how pixel values in a neighboring pixel group are changed.

FIG. 10 illustrates how pixel values in the neighboring pixel group are changed. In FIG. 10, a pixel of interest 702 in a tone image 701 is hatched with diagonal parallel lines, and pixels 703 (hereinafter, neighboring pixels 703) included in the neighboring pixel group are hatched with diagonal parallel lines different from those of the pixel of interest 702. The neighboring pixels 703 included in the neighboring pixel group are pixels having a predetermined positional relationship with the pixel of interest 702. In the present embodiment, the neighboring pixel group includes two neighboring pixels 703 that are adjacent to the right and bottom sides of the pixel of interest 702. In step S138, the pixel values in the neighboring pixel group are changed by multiplying the pixel value of the pixel of interest 702 by a value obtained by dividing the difference between the provisional second dot size and the second dot size by the provisional second dot size, and then equally distributing and adding the multiplication result to the neighboring pixels 703 included in the neighboring pixel group.

For example, when the provisional second dot size is the medium size, the second dot size determined in step S137 is the small size and therefore the amount of ink corresponding to the difference between the provisional second dot size and the second dot size is 6 3=3 pl. As described above, the pixel value of the pixel of interest is 204. Thus, as indicated by the hollow arrows in FIG. 10, a pixel value of 204 (6−3)/6=102 is equally distributed to the two neighboring pixels 703 included in the neighboring pixel group. In other words, a pixel value of 51 is added to each of the neighboring pixels 703, and consequently the neighboring pixels 703 each have a pixel value of 255.

When the provisional second dot size is the large size, the second dot size determined in step S137 is a small size and therefore the amount of ink corresponding to the difference between the provisional second dot size and the second dot size is 9 3=6 pl. Thus, a pixel value of 204 (9−3)/9=136 is equally distributed to the two neighboring pixels 703 included in the neighboring pixel group. In other words, a pixel value of 68 is added to each of the neighboring pixels 703, and consequently the neighboring pixels 703 each have a pixel value of 272. In step S138, if the pixel values of the neighboring pixels 703 become greater than 255 by the addition of the pixel value, the pixel values of the neighboring pixels 703 are changed to a pixel value of 255.

Figure 11:
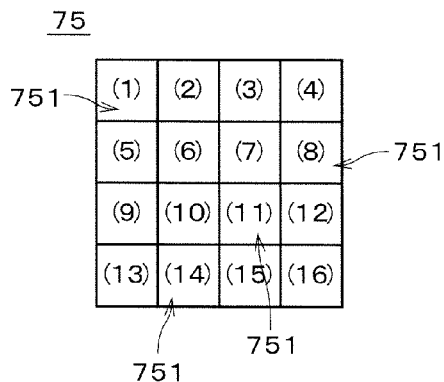
FIG. 11 illustrates a processing order.

When the second dot size has been determined and the pixel values in the neighboring pixel group have been changed as necessary, the pixel of interest is changed to the next pixel in accordance with a predetermined processing order (described later) of the pixel positions 751 (steps S139 and S140). The procedure then returns to step S133, and the processing of steps S133 to S138 is performed on the new pixel of interest. FIG. 11 illustrates the above processing order. In the image recording apparatus 1, the processing of steps S133 to S138 is performed in descending order of the numbers in the parentheses around the pixel positions 751 in FIG. 11. As illustrated in FIG. 11, the processing of steps S133 to S138 is performed in sequential order from a pixel position 751 at one end to a pixel position 751 at the other end in rows of the pixel positions 751 in the halftone image region 75. Alternatively, the processing of steps S133 to S138 may be performed in sequential order from a pixel position 751 at one end to a pixel position 751 at the other end in columns of the pixel positions 751 in the halftone image region 75.

In the image recording apparatus 1, steps S133 to S140 are repeated under the control of the repetition control part 466 illustrated in FIG. 8 until the second dot sizes at the pixel positions 751 corresponding to all the pixels in the cyan tone image are determined. Through this, the second halftone image data for use in recording a cyan image is generated.

Although the above description takes the example of a case in which the first dot size at the target pixel position 751 is the large size, the following describes other cases. For example, if the provisional second dot size is one of the zero size, the small size, and the medium size when the first dot size at the target pixel position 751 is the medium size, the total dot size will be less than or equal to the first threshold dot size and therefore the second dot size is determined to be the provisional second dot size. If the provisional second dot size is the large size, the second dot size is determined to be the medium size, which is the largest dot size within the range of the difference between the first threshold dot size and the first dot size. When the first dot size at the target pixel position 751 is either the small size or the zero size, the second dot size is always determined to be a size equal to the provisional second dot size.

When the generation of the second halftone image data has ended, the third halftone image data generation part 427 illustrated in FIG. 3 performs halftone processing on the magenta tone image (i.e., the magenta tone image is halftoned) by comparing the pixel value (in the present embodiment, 179) of each pixel in the magenta tone image, which is a third color component image, with a threshold value in the matrix set for magenta with reference to the first halftone image data and the second halftone image data. Through this, third halftone image data indicating the sizes of a plurality of magenta dots to be formed at the pixel positions in the halftone image region is generated (step S14). When the size of magenta dots is referred to as a "third dot size," the third dot size is one of a large size that is a largest size, medium and small sizes that are intermediate sizes smaller than the largest size, and a zero size, as with the first and second dot sizes.

Figure 12:
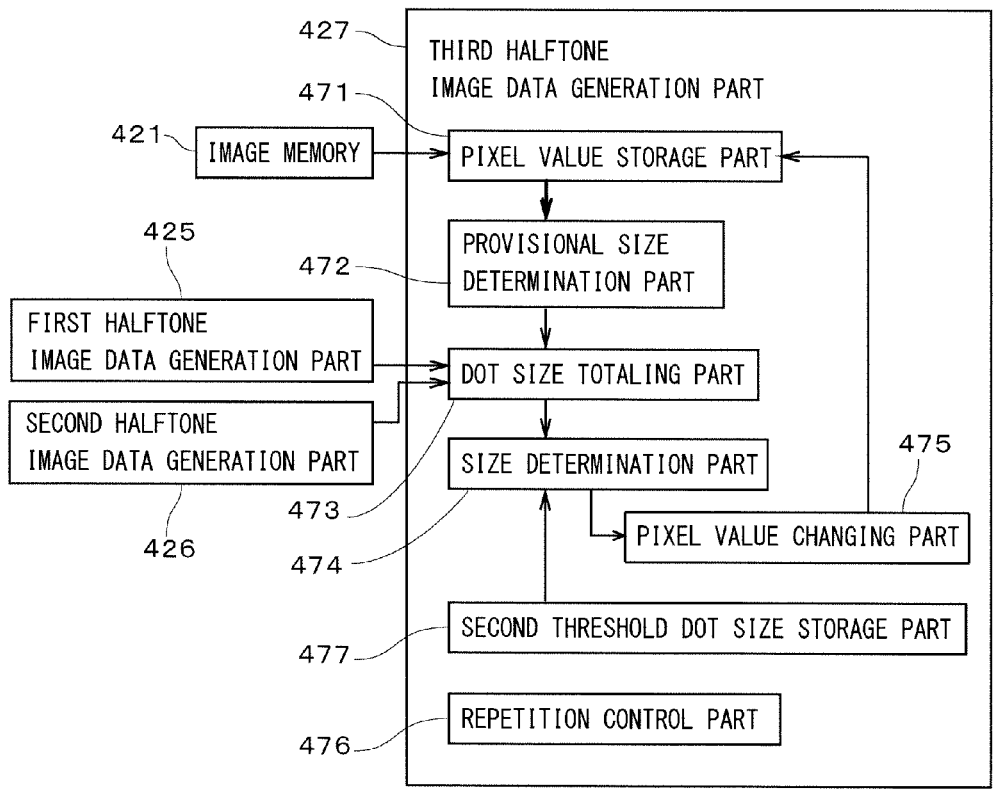
FIG. 12 is a block diagram illustrating the functions of a third halftone image data generation part.
Figure 13A:
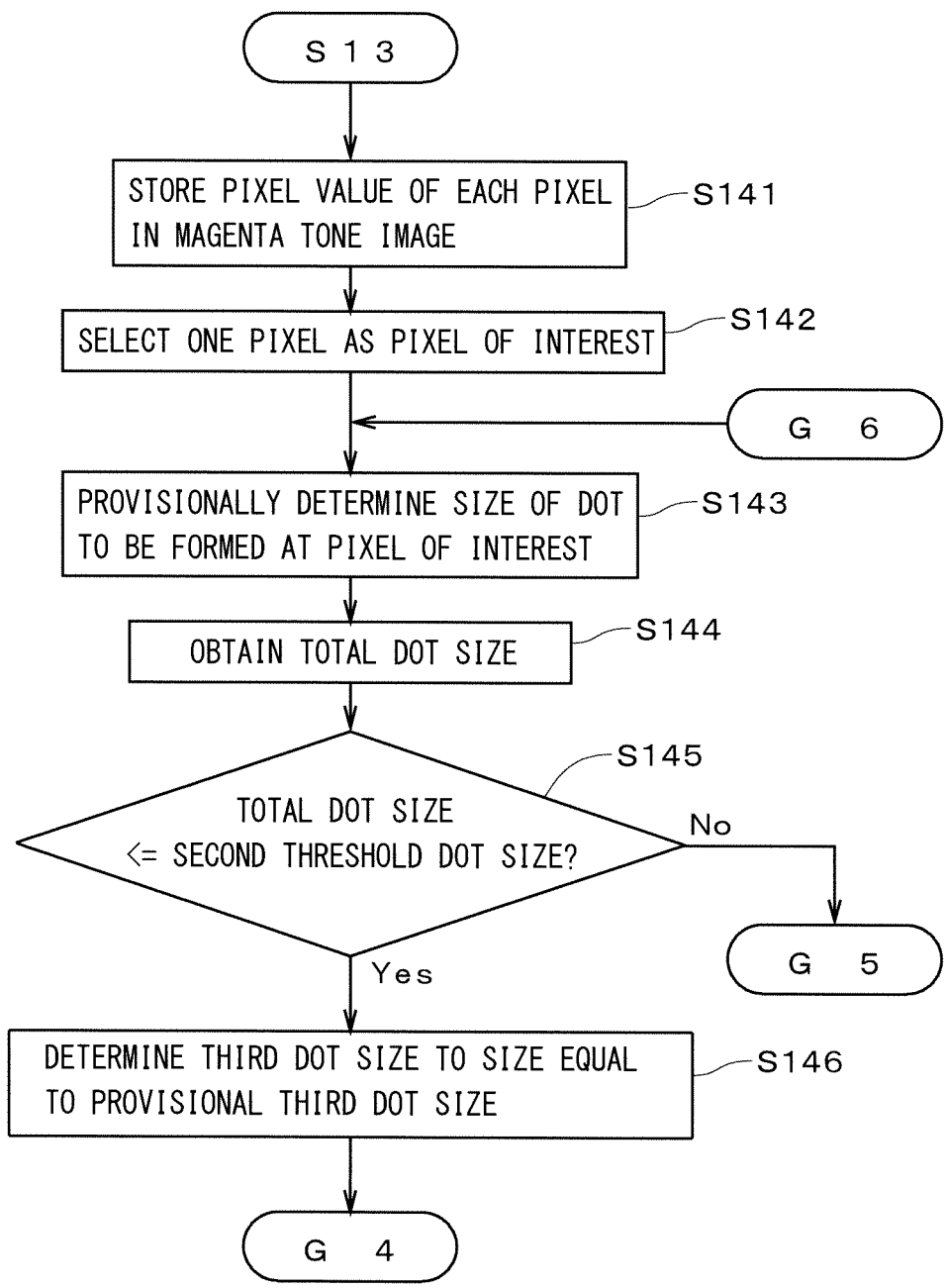
FIG. 13A illustrates part of the procedure of image recording.
Figure 13B:
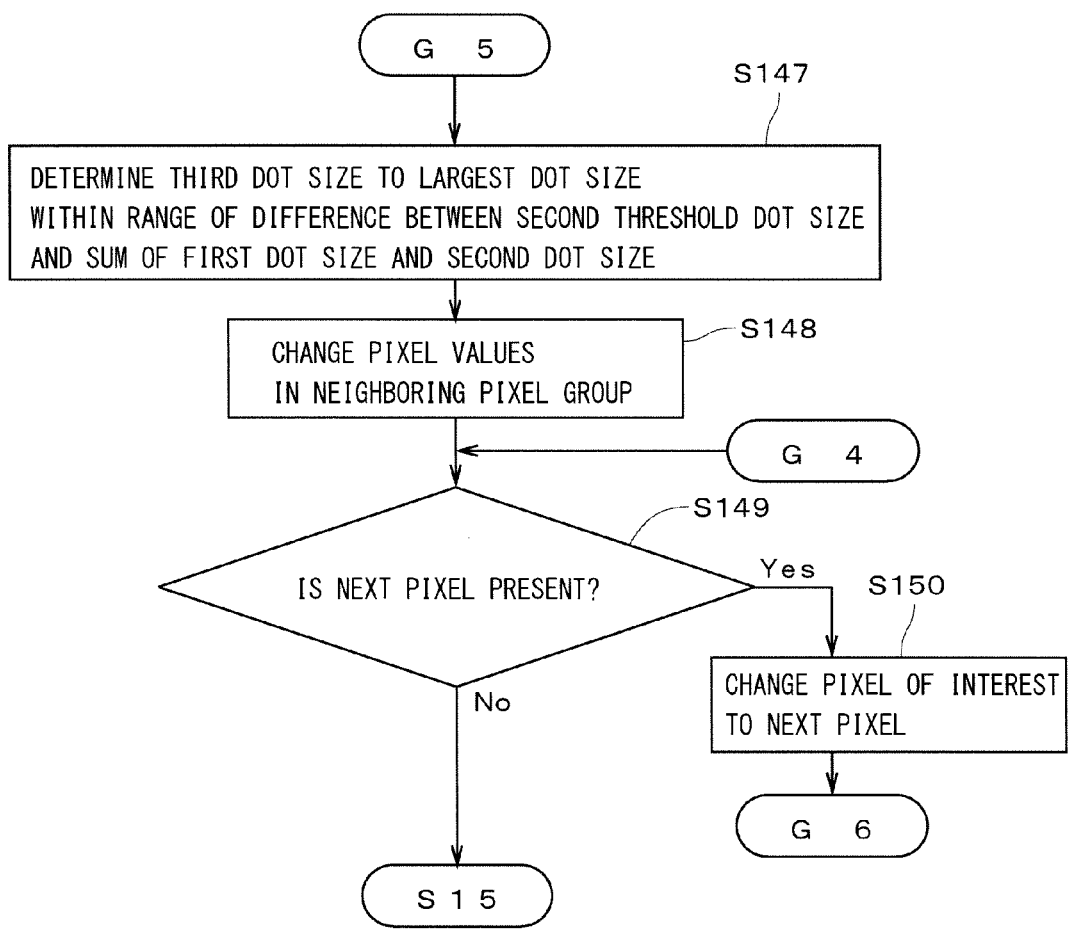
FIG. 13B illustrates part of the procedure of image recording.

FIG. 12 is a block diagram illustrating the functions of the third halftone image data generation part 427. FIGS. 13A and 13B illustrate a detailed procedure of step S14. As illustrated in FIG. 12, the third halftone image data generation part 427 includes a pixel value storage part 471, a provisional size determination part 472, a dot size totaling part 473, a size determination part 474, a pixel value changing part 475, a repetition control part 476, and a second threshold dot size storage part 477.

The second threshold dot size storage part 477 stores a second threshold dot size for use in generating third halftone image data. The second threshold dot size indicates an upperlimit value for the sum of the dot sizes of black, cyan, and magenta inks to be recorded on a single pixel. The second threshold dot size is another threshold dot size different from the aforementioned first threshold dot size and is greater than or equal to the first threshold dot size. In the present embodiment, the second threshold dot size is a size corresponding to the sum of the large dot, the medium dot, and the small dot. The amount of ink corresponding to that size is 18 pl, and the halftone pixel value corresponding to that size is "6." The second threshold dot size is also a size corresponding to the sum of three medium dots or a size corresponding to the sum of two large dots and dot zero.

The third halftone image data generation part 427 reads the magenta tone image from the image memory 421 and stores the pixel value of each pixel in the pixel value storage part 471 (step S141). Then, as in step S132, one pixel in the magenta tone image is selected as a pixel of interest (step S142). In the present embodiment, a pixel corresponding to the pixel position 751 of the upper left corner of the halftone image region 75 illustrated in FIG. 7 is selected as a pixel of interest. Next, the provisional size determination part 472 performs halftone processing similar to that in step S133 on the pixel of interest and provisionally determines the size of a magenta dot to be formed at the target pixel position 751 corresponding to the pixel of interest in the halftone image region 75 (step S143).

Specifically, the pixel value of the pixel of interest is compared with a threshold value of the large dot matrix 811 for magenta at the target pixel position 751 in the halftone image region 75. When the pixel value of the pixel of interest is greater than the threshold value, a halftone pixel value of "3" is provisionally assigned to the target pixel position 751. In other words, the size of a magenta dot to be formed at the target pixel position 751 is provisionally determined to be the large size.

When the pixel value of the pixel of interest is less than or equal to the threshold value in the large dot matrix 811 the pixel value of the pixel of interest is compared with a threshold value in the medium dot matrix 812 for magenta. When the pixel value of the pixel of interest is greater than the threshold value in the medium dot matrix 812, a halftone pixel value of "2" is provisionally assigned to the target pixel position 751, and the size of a magenta dot to be formed at the target pixel position 751 is provisionally determined to be the medium size.

When the pixel value of the pixel of interest is less than or equal to the threshold value in the medium dot matrix 812, the pixel value of the pixel of interest is compared with a threshold value in the small dot matrix 813 for magenta. When the pixel value of the pixel of interest is greater than the threshold value in the small dot matrix 813, a halftone pixel value of "1" is provisionally assigned to the target pixel position 751, and the size of a magenta dot to be formed at the target pixel position 751 is provisionally determined to be the small size. When the pixel value of the pixel of interest is less than or equal to the threshold value in the small dot matrix 813, a halftone pixel value of "0" is provisionally assigned to the target pixel position 751, and the size of a magenta dot to be formed at the target pixel position 751 is provisionally determined to be the zero size.

When the provisional determination of the dot size has ended, the dot size totaling part 473 acquires the first dot size from the first halftone image data generation part 425 and the second dot size from the second halftone image data generation part 426. The first dot size is the size of a black dot formed at the target pixel position 751 in the halftone image region 75, and the second dot size is the size of a cyan dot formed at the target pixel position 751. As illustrated in FIG. 7, the halftone pixel value for black at the target pixel position 751 is "3" and thus the first dot size is the large size. Also, as described above, the second dot size is either the small size or the zero size, and the following description is given on the assumption that the second dot size is the small size. In this case, the amount of ink corresponding to the sum of the first dot size and the second dot size is 12 pl.

The dot size totaling part 473 obtains a total dot size that is the sum of the above first dot size, the above second dot size, and a provisional third dot size that is the size of a magenta dot provisionally determined in step S143 (step S144). The total dot size obtained in step S144 is another total dot size different from that obtained in step S134. In the following description, the total dot size obtained in step S134 is referred to as a "first total dot size," and the total dot size obtained in step S144 is referred to as a "second total dot size."

Then, the size determination part 474 compares the second total dot size with the second threshold dot size that is stored in advance in the second threshold dot size storage part 477 (step S145). Specifically, the amount of ink (18 pl) corresponding to the second threshold dot size and the amount of ink corresponding to the second total dot size are compared, and when the amount of ink corresponding to the second total dot size is less than or equal to 18 pl, it is determined that the second total dot size is less than or equal to the second threshold dot size. When the amount of ink corresponding to the second total dot size is greater than 18 pl, it is determined that the second total dot size is greater than the second threshold dot size.

The comparison between the second total dot size and the second threshold dot size may be made by comparing the halftone pixel value (i.e., 6) corresponding to the second threshold dot size and a halftone pixel value corresponding to the second total dot size (i.e., the sum of the halftone pixel values for black, cyan, and magenta at the target pixel position 751). In this case, when the halftone pixel value corresponding to the second total dot size is less than or equal to "6," it is determined that the second total dot size is less than or equal to the second threshold dot size. When the halftone pixel value corresponding to the second total dot size is greater than "6," it is determined that the second total dot size is greater than the second threshold dot size.

When the provisional third dot size is the zero size (the corresponding amount of ink is 0 pl), the second total dot size is a size corresponding to the sum of the large size, which is the first dot size, the small size, which is the second dot size, and the zero size, which is the provisional third dot size, and the amount of ink corresponding to the second total dot size is 12 pl. It is thus determined that the second total dot size is less than or equal to the second threshold dot size, and the size determination part 474 determines a third dot size, which is the size of a magenta dot to be formed at the target pixel position 751, to be a size equal to the provisional third dot size, i.e., the zero size (step S146). Thus, a value of "0" is assigned as a halftone pixel value for magenta at the target pixel position 751.

When the provisional third dot size is the small size (the corresponding amount of ink is 3 pl), the second total dot size is a size corresponding to the sum of the large size and two small sizes, and the amount of ink corresponding to the second total dot size is 15 pl. It is thus determined that the second total dot size is less than or equal to the second threshold dot size as described above, and the size determination part 474 determines the third dot size to be a size equal to the provisional third dot size, i.e., the small size (step S146). Thus, a value of "1" is assigned as a halftone pixel value for magenta at the target pixel position 751.

When the provisional third dot size is the medium size (the corresponding amount of ink is 6 pl), the second total dot size is a size corresponding to the sum of the large size, the small size and the medium size, and the amount of ink corresponding to the second total dot size is 18 pl. It is thus determined that the second total dot size is less than or equal to the second threshold dot size as described above, and the size determination part 474 determines the third dot size to be a size equal to the provisional third dot size, i.e., the medium size (step S146). Thus, a value of "2" is assigned as a halftone pixel value for magenta at the target pixel position 751.

When the provisional third dot size is the large size, the second total dot size is a size corresponding to the sum of the two large sizes and the small size, and the amount of ink corresponding to the second total dot size is 21 pl. It is thus determined that the second total dot size is greater than the second threshold dot size. Then, the size determination part 474 determines the third dot size to be the largest dot size within the range of a difference between the second threshold dot size and the sum of the first dot size and the second dot size, i.e., the medium size (step S147). In terms of the amount of ink corresponding to the dot size, the third dot size is determined to be the medium size, that is the largest dot size within the range of the difference (6 pl) between the amount of ink (18 pl) corresponding to the second threshold dot size and the amount of ink (12 pl) corresponding to the sum of the first dot size and the second dot size. Thus, a value of "2" is assigned as a halftone pixel value for magenta at the target pixel position 751.

When it is determined in step S145 that the second total dot size is greater than the second threshold dot size, step S147 is followed by a step in which the pixel value changing part 475 accesses the magenta tone image stored in the pixel value storage part 471. The pixel value changing part 475 then changes the pixel values in the neighboring pixel group that includes pixels located at one or more pixel positions 751 at which the third dot size has not yet been determined among pixel positions 751 around the pixel of interest in the magenta tone image, on the basis of the pixel value of the pixel of interest and the difference between the provisional third dot size and the third dot size at the target pixel position 751 (step S148).

In step S148, similarly to step S138, the pixel values in the neighboring pixel group are changed by multiplying the pixel value of the pixel of interest 702 (see FIG. 10) by a value obtained by dividing the difference between the provisional third dot size and the third dot size by the provisional third dot size, and then equally distributing and adding the multiplication result to the neighboring pixels 703 included in the neighboring pixel group. Specifically, when the provisional third dot size is the large size, the third dot size determined in step S147 is the medium size and therefore the amount of ink corresponding to the difference between the provisional third dot size and the third dot size is 9−6=3 pl. As described above, the pixel value of the pixel of interest is 179. Thus, a pixel value of 179 (9−6)/9≈60 is equally distributed to the two neighboring pixels 703 included in the neighboring pixel group (see FIG. 10). In other words, a pixel value of 30 is added to each of the neighboring pixels 703 and consequently the pixel values of the neighboring pixels 703 are changed to a pixel value of 209.

When the third dot size has been determined and the pixel values in the neighboring pixel group have been changed as necessary, the pixel of interest is changed to the next pixel in accordance with a predetermined processing order (see FIG. 11) of the pixel positions 751 (steps S149 and S150). The procedure then returns to step S143, and the processing of steps S143 to S148 is performed on the new pixel of interest. Similarly to the processing of steps S133 to S138, the processing of steps S143 to S148 is performed in sequential order from a pixel position 751 at one end to a pixel position 751 at the other end in rows of the pixel positions 751 in the halftone image region 75 illustrated in FIG. 1I. Alternatively, the processing of steps S143 to S148 may be performed in sequential order from a pixel position 751 at one end to a pixel position 751 at the other end in columns of the pixel positions 751 in the halftone image region 75.

In the image recording apparatus 1, steps S143 to S150 are repeated under the control of the repetition control part 466 until the third dot sizes at the pixel positions 751 corresponding to all the pixels in the magenta tone image are determined. Through this, the third halftone image data for use in recording a magenta image is generated.

While the above description takes the example of the case in which the first dot size and the second dot size at the target pixel position 751 are respectively the large size and the small size, the following describes other cases. For example, when one of the first dot size and the second dot size at the target pixel position 751 is the large size and the other is the zero size, the second total dot size will always be less than or equal to the second threshold dot size and therefore the third dot size will always be determined to be a size equal to the provisional third dot size. The same applies to the case where one of the first dot size and the second dot size is the medium size and the other is the small size, the case where the first dot size and the second dot size are both the small size or the zero size, and the case where one of the first dot size and the second dot size is the small size and the other is the zero size.

When one of the first dot size and the second dot size at the target pixel position 751 is the large size and the other is the medium size, if the provisional third dot size is either the zero size or the small size, the third dot size is determined to be a size equal to the provisional third dot size. If the provisional third dot size is either the medium size or the large size, the third dot size is determined to be the small size, which is the largest dot size within the range of the difference between the second threshold dot size and the sum of the first dot size and the second dot size.

When the first dot size and the second dot size at the target pixel position 751 are both the large size, if the provisional third dot size is one of the large size, the medium size and the small size, the second total dot size will be greater than the second threshold dot size and therefore the third dot size is always determined to be the zero size.

When the first dot size and the second dot size at the target pixel position 751 are both the medium size, if the provisional third dot size is one of the zero size, the small size, and the medium size, the third dot size is determined to be a size equal to the provisional third dot size. If the provisional third dot size is the large size, the third dot size is determined to be the medium size, which is the largest dot size within the range of the difference between the second threshold dot size and the sum of the first dot size and the second dot size.

When the generation of the third halftone image data has ended, the fourth halftone image data generation part 428 illustrated in FIG. 3 performs halftone processing on the yellow tone image, which is a fourth color component image (i.e., the yellow tone image is halftoned), similarly to the halftone processing performed on the black tone image in step S12, by comparing the pixel value of each pixel in the yellow tone image with a threshold value in the matrix set for yellow. Through this, fourth halftone image data indicating the sizes of a plurality of dots to be formed at the pixel positions in the halftone image region is generated (step S15). In the present embodiment, the dot size at all the pixel positions 751 in the halftone image region 75 is the zero size because the tone value in the yellow tone image generated in step S11 is 0 as described above.

When, as described above, halftone image data regarding a portion to be first printed is generated and prepared for each color component through halftone processing on a multi-tone color image, the movement mechanism 2 is controlled by the movement control part 412 of the output control part 41 and starts moving the recording media 9 in the movement direction (step S16). In synchronization with the movement of the recording media 9, the ejection control part 411 controls the head 31 for ejecting black ink on the basis of the first halftone image data so that a first halftone image of black dots is recorded on a recording medium 9 (step S17).

Next, the head 31 for ejecting cyan ink is controlled on the basis of the second halftone image data and a second halftone image of cyan dots is recorded on a region of the recording medium 9 in which black dots have been recorded (hereinafter, "already recorded region") (step S18). Then, the head 31 for ejecting magenta ink is controlled on the basis of the third halftone image data, and a third halftone image of magenta dots is recorded on the already recorded region of the recording medium 9 (step S19). Then, the head 31 for ejecting yellow ink is controlled on the basis of the fourth halftone image data, and a fourth halftone image of yellow dots is recorded on the already recorded region of the recording medium 9 (step S20). Note that in the present embodiment, yellow dots are not formed on the recording media 9. The recording of a halftone image of each color component is performed in parallel with the above-described generation of the halftone image data.

In the image recording apparatus 1, as already described, the recording media 9 are supplied one after another from the supply part 51 and are collected by the discharge part 52 after recording of an image. When the entire halftone image has been recorded on the desired number of recording media 9, the supply of the recording media 9 is stopped and the image recording operation ends (step S21).

As described above, when generating the second halftone image data indicating the sizes of cyan (second color component) dots to be formed at the pixel positions in the halftone image region, the image recording apparatus 1 performs halftone processing on the cyan tone image with reference to the first halftone image data indicating the sizes of black (first color component) dots. By referencing the first halftone image data when generating the second halftone image data, the first total dot size, which is the sum of the black dot size (first dot size) and the cyan dot size (second dot size) to be formed at each pixel position, can be reduced to less than or equal to a predetermined first threshold dot size. This makes it possible to prevent black and cyan dots from excessively overlapping each other when cyan dots are formed during recording of images on the recording media 9. Consequently, poor color reproduction (dulling of color) and cockling (phenomenon where the surfaces of the recording media 9 become rippled) due to mixture of black and cyan inks can be suppressed.

When the cyan dot size that has provisionally been determined by comparison using the matrix set is changed in order to reduce the first total dot size to less than or equal to the first threshold dot size, pixel values in the neighboring pixel group located around the pixel of interest at which the dot size is changed are changed on the basis of the pixel value of the pixel of interest and the amount of change in the cyan dot size (i.e., the difference between the provisional second dot size and the second dot size). It is thus possible to correct the influence caused by the change of the cyan dot size and accurately represent the cyan tone image on the recording media 9.

When generating the third halftone image data indicating the sizes of magenta (third color component) dots, the image recording apparatus 1 performs halftone processing on the magenta tone image with reference to the first halftone image data and the second halftone image data. In the case of generating the third halftone image data, the first halftone image data and the second halftone image data are referenced in order to reduce the second total dot size, which is the sum of the black dot size, the cyan dot size, and the magenta dot size (third dot size) to be formed at each pixel position, to less than or equal to a predetermined second threshold dot size. This makes it possible to prevent black, cyan, and magenta dots from excessively overlapping one another when magenta dots are formed during recording of images on the recording media 9. Consequently, poor color reproduction and cockling due to mixture of black, cyan, and magenta inks can be suppressed.

When the magenta dot size that has provisionally been determined by comparison using the matrix set is changed in order to make the second total dot size less than or equal to the second threshold dot size, pixel values in the neighboring pixel group located around the pixel of interest at which the dot size is changed are changed on the basis of the pixel value of the pixel of interest and the amount of change in the magenta dot size (i.e., the difference between the provisional third dot size and the third dot size). It is thus possible to correct the influence caused by the change of the magenta dot size and accurately represent the magenta tone image on the recording media 9.

As described above, in the image recording apparatus 1, a larger number of types of dot sizes that can be formed on the recording media 9 in order to suppress poor color reproduction and cockling by changing the dot size enables poor color reproduction and cockling to be suppressed more efficiently. From this, excessive overlapping of black and cyan dots can more efficiently be prevented and accordingly the cyan tone image can more accurately be represented when the first dot size and the second dot size are each one of a zero size, an intermediate size, and a largest size rather than when the first dot size and the second dot size are each either a zero size or a largest size (i.e., when it is only possible to select whether or not to record a dot at each pixel position). The same applies to the third dot size. That is, if the third dot size is one of a zero size, an intermediate size, and a largest size, excessive overlapping of black, cyan, and magenta dots can more efficiently be prevented and the magenta tone image can more accurately be represented.

On the recording media 9, when a black dot and dots of the other color component overlap one another, the color components other than black are not recognized in the region where the dots overlap. In view of this, as described above, the first color component is set to black and the first halftone image data indicating the arrangement of black dots is taken into consideration in the case of generating the second halftone image data and the third halftone image that indicate the arrangements of cyan and magenta dots. This prevents cyan and magenta dots from overlapping black dots and improves color reproduction of images that are recorded on the recording media 9. Also, yellow which has little influence on the other color components is set as the fourth color component, and the fourth halftone image data is generated without giving consideration to the halftone image data for the other color components, similarly to the halftone processing performed on the black tone image. This makes it possible to simplify the generation of the fourth halftone image data while suppressing the influence on the halftone images of the other color components.

As described above, the processing of steps S133 to S138 is performed in sequential order from a pixel position 751 at one end to a pixel position 751 at the other end in rows or columns of the pixel positions 751 in the halftone image region 75.

By reducing the number of inflection points where the direction in which the processing proceeds is changed in this way in the order in which the processing of steps S133 to S138 is performed, the number of pixels at which the second dot size has not yet been determined around the pixel of interest can be made substantially constant, irrespective of the degree of progress of the processing (i.e., the position of the pixel of interest). Consequently, it is possible to maintain uniform quality of the processing of steps S133 to S138 over substantially the entire halftone image region. The same applies to steps S143 to S148. That is, uniform quality of processing over substantially the entire halftone image region can be achieved by reducing the number of the above inflection points in the processing order.

The image recording apparatus 1 performs separation processing along with gray component replacement on a color image (step S11) prior to the step of generating the first halftone image data (step S12). It is thus possible to suppress overlapping of dots of multiple colors formed at each pixel position and to efficiently suppress poor color reproduction and cockling.

The image recording apparatus 1 may change the threshold values in the large dot matrix 811, the medium dot matrix 812, and the small dot matrix 813 of the matrix set for cyan during repetition of steps S133 to S138 in step S13. For example, the threshold values in each threshold matrix may be changed by assigning a random number to the threshold values in the threshold matrix every time the size of a dot to be formed at one pixel position is determined. Alternatively, a random number may be assigned every time the sizes of dots to be formed in one row of pixel positions are determined. By changing the threshold values in a matrix set in this way, the change in the dot size in step S137 can irregularly occur in the entire halftone image region. In other words, it is possible to increase the irregularity of the occurrence of the above change in the dot size. As a result, it is possible to suppress the appearance of an unintentional regular pattern accompanying the change in the dot size. The same applies to step S14.

Figure 14:
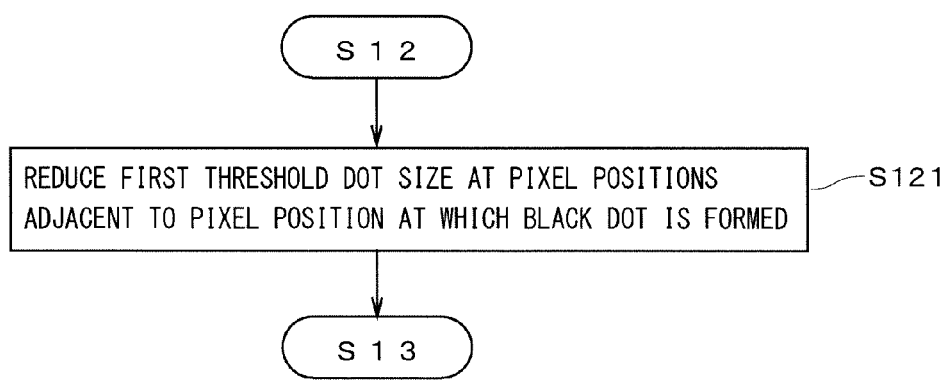
FIG. 14 illustrates part of the procedure of image recording.

The image recording apparatus 1 may perform another step between steps S12 and S13 as illustrated in FIG. 14, specifically, the step of reducing the first threshold dot size at pixel positions adjacent to a pixel position where it is determined in step S12 that a black dot is to be formed (step S121). Specifically, a pixel position having a halftone pixel value of "1" or more (i.e., a pixel position where a small, medium, or large black dot is formed) is extracted from the first halftone image data generated in step S12. Then, the first threshold dot size at four pixel positions that are adjacent to the upper, lower, left, and right sides of the extracted pixel position are changed from the size corresponding to the sum of the large dot and the small dot to, for example, a size corresponding to the sum of the small dot and the small dot (the corresponding amount of ink is 6 pl). Alternatively, the first threshold dot size at eight pixel positions adjacent to the upper, lower, left, right, and diagonal sides of the extracted pixel position may be reduced.

This suppresses the formation of cyan dots at the pixel positions adjacent to the pixel position where a black dot is formed, and even if cyan dots are formed, reduces the sizes of the cyan dots that are formed. Consequently, it is possible to give consideration to the spread of black dots formed on the recording media 9 and to prevent excessive overlapping of the spread black dots and the cyan dots.

The image recording apparatus 1 may also perform another step between steps S13 and step S14, specifically, the step of reducing the second threshold dot size at pixel positions adjacent to a pixel position where it is determined that a black or cyan dot is formed. Specifically, a pixel position having a halftone pixel value of "1" or more is extracted from the first halftone image data, and a pixel position having a halftone pixel value of "1" or more is extracted from the second halftone image data. Then, the second threshold dot size at pixel positions adjacent to the upper, lower left, and right sides of the extracted pixel position or at pixel positions adjacent to the upper, lower, left, right, and diagonal sides of the extracted pixel position is changed from the size corresponding to the sum of the large dot and the large dot to, for example, a size corresponding to the sum of the large dot and the medium dot (the corresponding amount of ink is 15 pl).

This suppresses the formation of magenta dots at the pixel positions adjacent to the pixel position where a black or cyan dot is formed, and even if magenta dots are formed, reduces the sizes of the magenta dots that are formed. Consequently, it is possible to give consideration to the spread of black and cyan dots formed on the recording media 9 and to prevent excessive overlapping of the spread black and cyan dots and the magenta dots.

Figure 15:
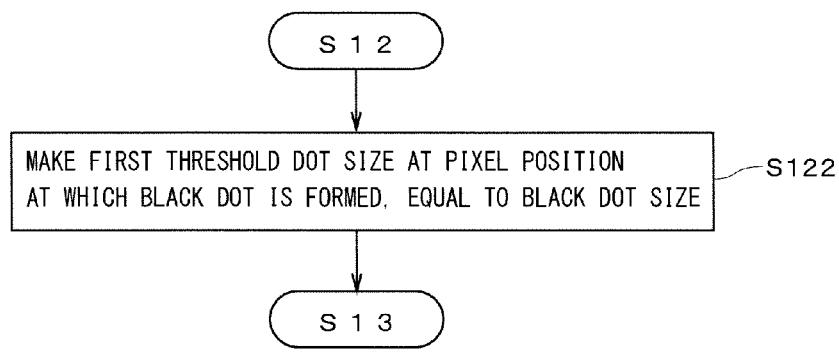
FIG. 15 illustrates part of the procedure of image recording.

The image recording apparatus 1 may also perform another step between steps S12 and S13 as illustrated in FIG. 15, specifically, the step of making the first threshold dot size at the pixel position where it is determined in step S12 that a black dot is to be formed, equal to the size of that black dot (step S122). In this case, in step S135, the total dot size at the pixel position where a black dot is formed always becomes greater than the first threshold dot size, with the exception of the case where the provisional second dot size, which is the provisionally determined cyan dot size, is the zero size and therefore a cyan dot is not formed at pixel position where a black dot is formed. It is thus possible to prevent cyan dots from overlapping black dots and to improve color reproduction of images recorded on the recording media 9.

The image recording apparatus 1 may also perform another step between steps S12 and S14, specifically, the step of making the second threshold dot size at a pixel position where it is determined in step S12 that a black dot is formed, equal to the size of that black dot. In this case, a magenta dot is not formed at a pixel position where a black dot is formed. It is thus possible to prevent magenta dots from overlapping black dots and to further improve color reproduction of images recorded on the recording media 9.

Next, an image recording apparatus according to a second embodiment of the present invention will be described. The image recording apparatus according to the second embodiment has substantially the same configuration as that of FIG. 1, and corresponding constituent elements are denoted by the same reference numerals in the following description. In the image recording apparatus according to the second embodiment, the functions of the control unit 4 are similar to those in FIG. 3, and the operation of recording an image is similar to that illustrated in FIG. 5. The second embodiment, however, differs in part from the first embodiment in the functions of the second halftone image data generation part 426 and the third halftone image data generation part 427 and in detailed procedures of steps S13 and S14, as described below.

Figure 16:
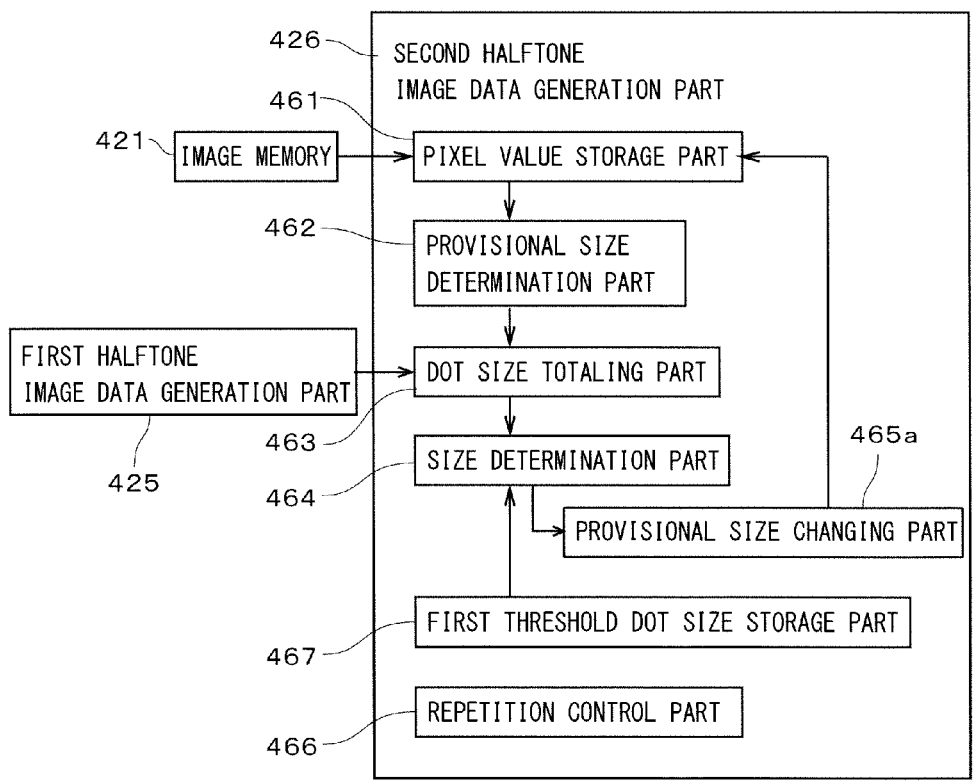
FIG. 16 is a block diagram illustrating the functions of a second halftone image data generation part according to a second embodiment.
Figure 17A:
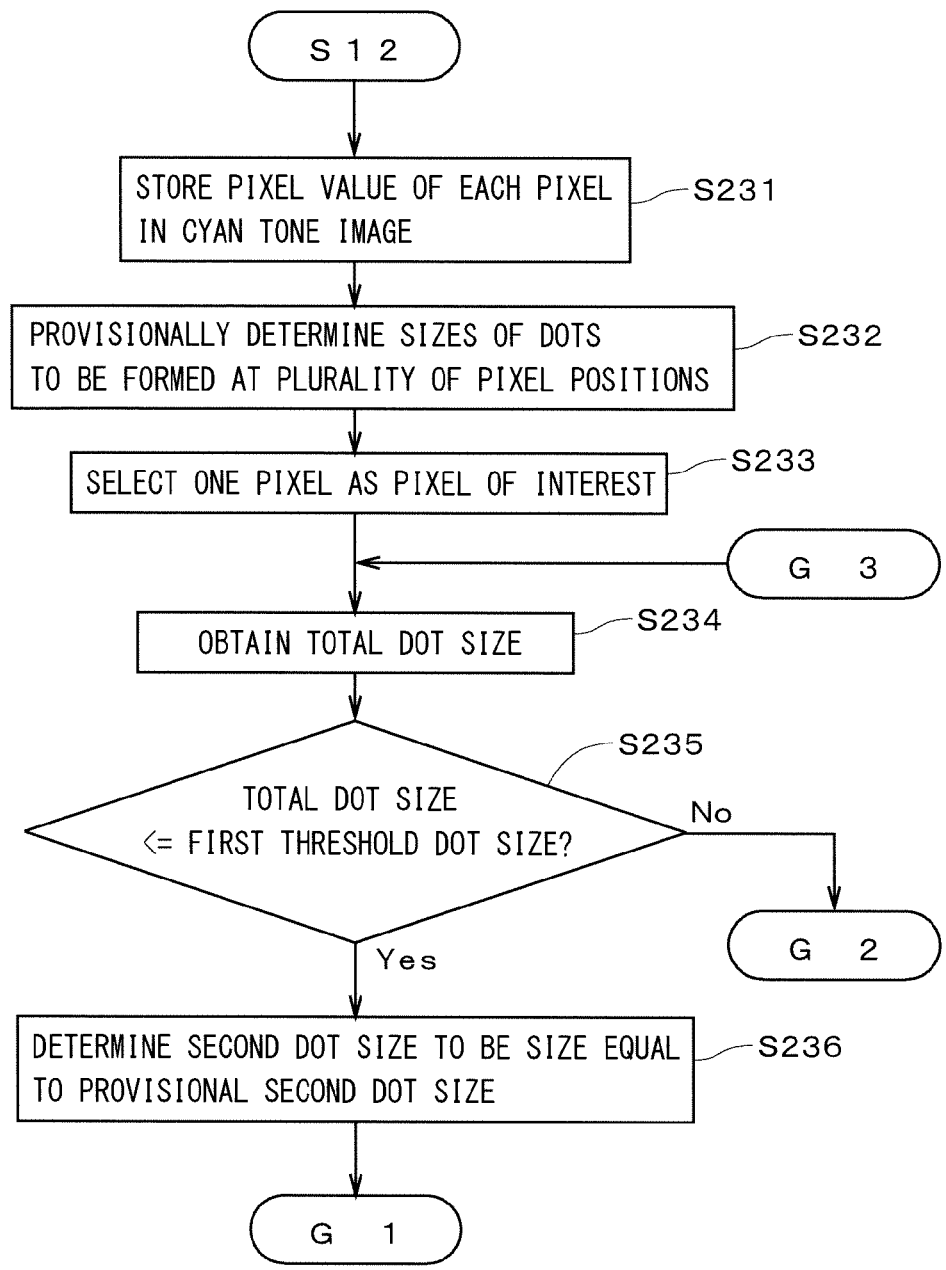
FIG. 17A illustrates part of the procedure of image recording.
Figure 17B:
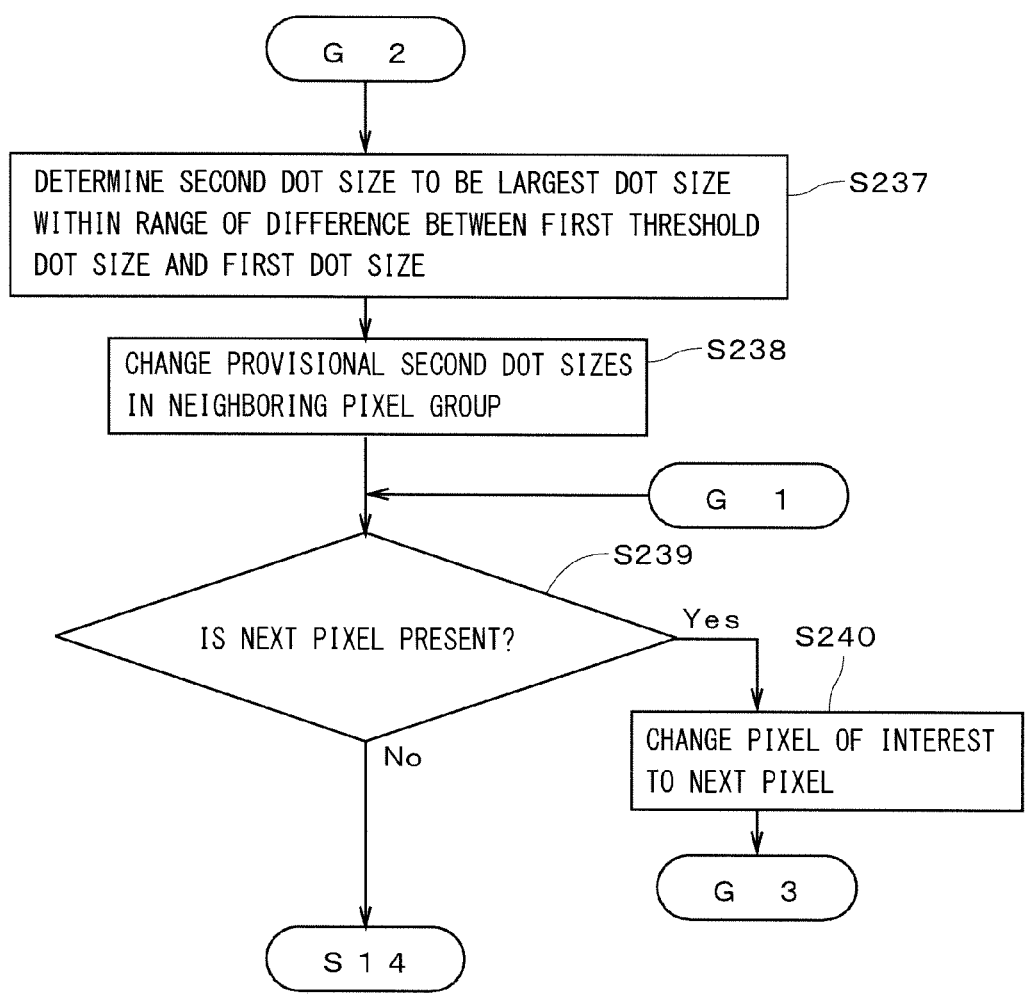
FIG. 17B illustrates part of the procedure of image recording.
Figure 18:
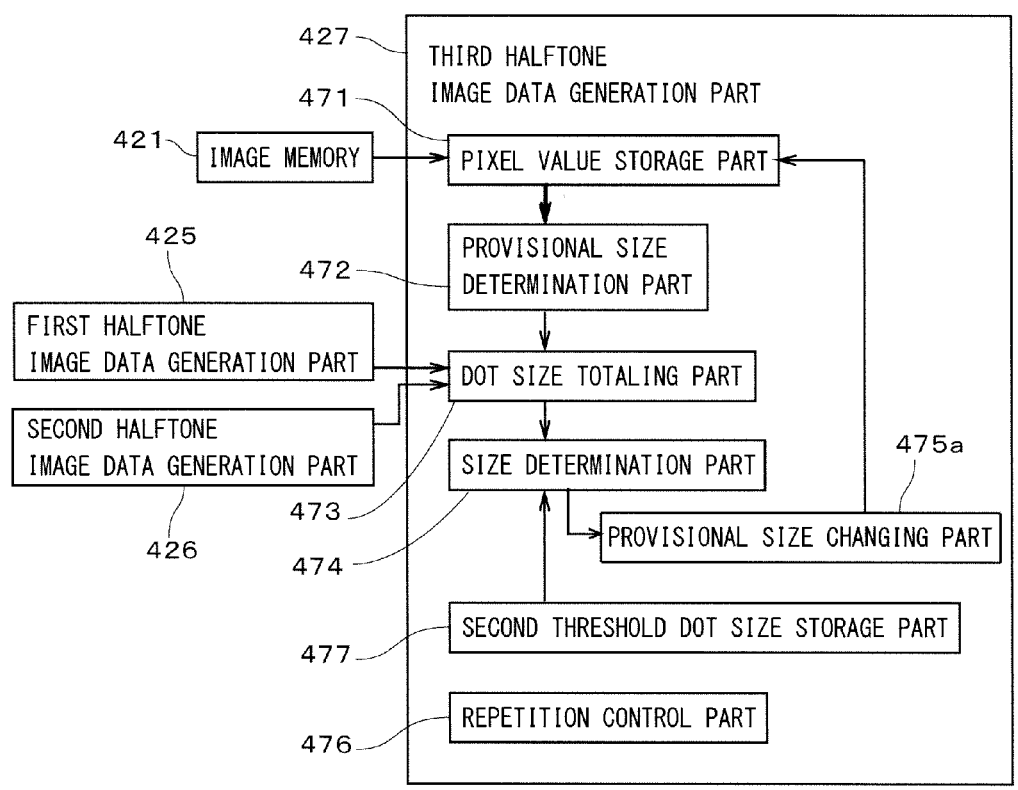
FIG. 18 is a block diagram illustrating the functions of a third halftone image data generation part.
Figure 19A:
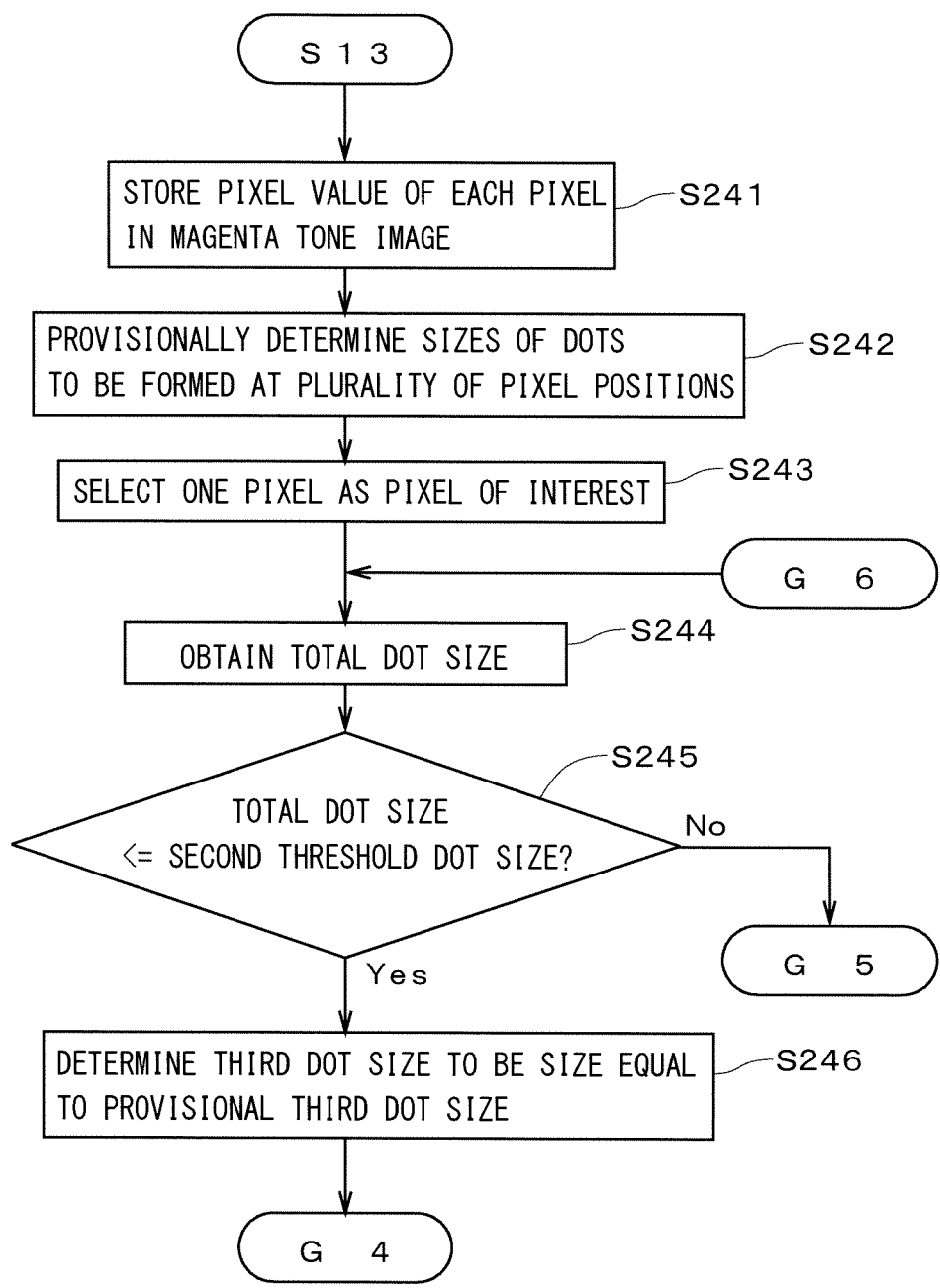
FIG. 19A illustrates part of the procedure of image recording.
Figure 19B:
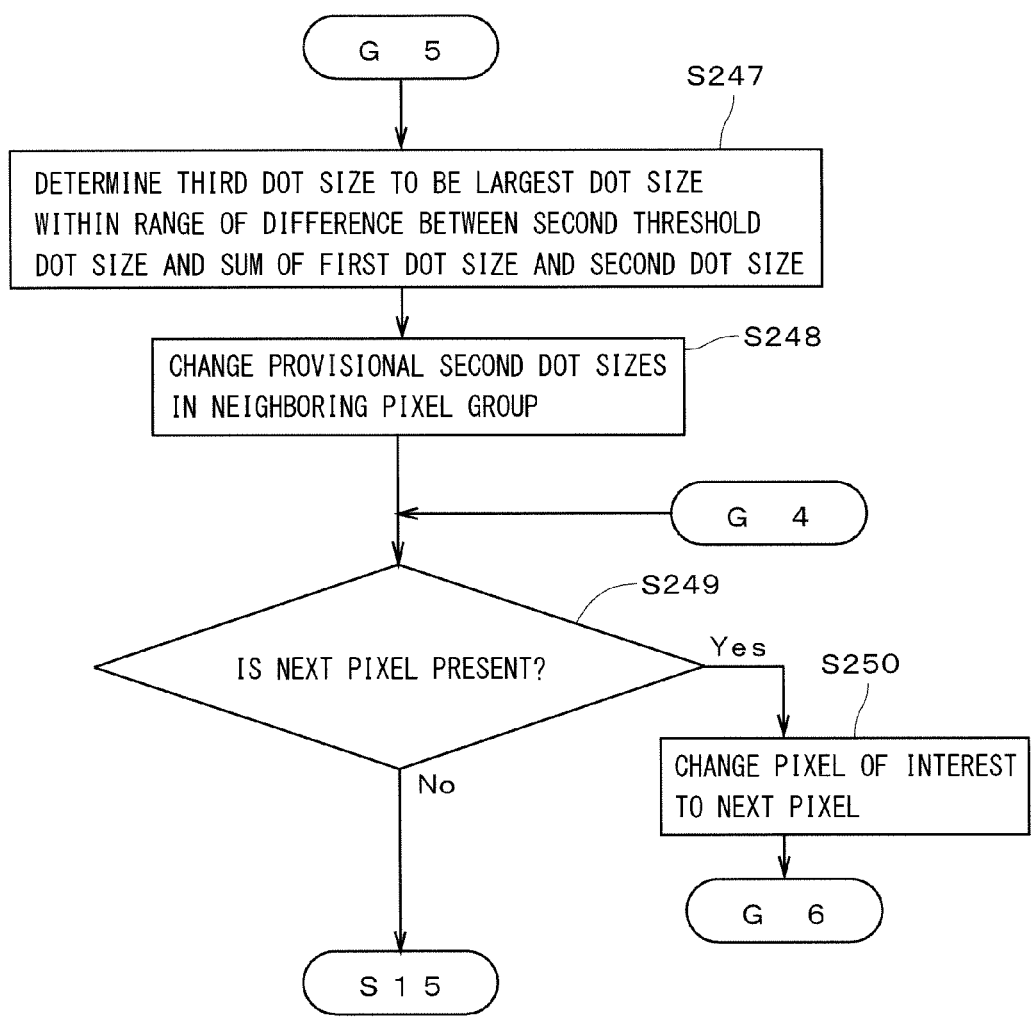
FIG. 19B illustrates part of the procedure of image recording.

FIGS. 16 and 18 are block diagrams illustrating the functions of the second halftone image data generation part 426 and the third halftone image data generation part 427, respectively, according to the second embodiment. As illustrated in FIGS. 16 and 18, the second halftone image data generation part 426 and the third halftone image data generation part 427 include provisional size changing parts 465a and 475a, respectively, instead of the pixel value changing parts 465 and 475 (see FIGS. 8 and 12). FIGS. 17A and 17B and FIGS. 19A and 19B illustrate detailed procedures of steps S13 and S14 respectively.

The second halftone image data generation part 426 illustrated in FIG. 16 reads a cyan tone image from the image memory 421 and stores the pixel value of each pixel in the pixel value storage part 461 as in step S131 (step S231). Then, the provisional size determination part 462 performs halftone processing on the cyan tone image, which is a second color component image (i.e., the cyan tone image is halftoned), similarly to the halftone processing performed on the black tone image in step S12, by comparing the pixel value of each pixel in the cyan tone image with a threshold value in the matrix set for cyan. Through this, the sizes of a plurality of cyan dots that are respectively to be formed at a plurality of pixel positions in a halftone image region are provisionally determined (step S232).

Next, one pixel in the cyan tone image is selected as a pixel of interest (step S233), and the dot size totaling part 463 acquires a first dot size from the first halftone image data generation part 425, the first dot size being the size of a black dot to be formed at a target pixel position corresponding to the pixel of interest. The dot size totaling part 463 then obtains a first total dot size that is the sum of the above first dot size and a provisional second dot size at the target pixel position, the provisional second dot size being the size of a cyan dot that has provisionally been determined in step S232 (step S234).

The size determination part 464 compares the first total dot size with a first threshold dot size that is stored in advance in the first threshold dot size storage part 467 (step S235). The comparison between the first total dot size and the first threshold dot size is performed by comparing the amounts of ink or halftone pixel values corresponding to both of the dot sizes as in step S135.

When the first total dot size is less than or equal to the first threshold dot size, a second dot size that is the size of a cyan dot to be formed at the target pixel position is determined to be a size equal to the provisional second dot size by the size determination part 464 (step S236). When the first total dot size is greater than the first threshold dot size, the second dot size is determined to be the largest dot size within the range of the difference between the first threshold dot size and the first dot size, as in step S137 (step S237).

When it has been determined in step S235 that the first total dot size is greater than the first threshold dot size, step S237 is followed by a step of extracting pixels located at one or more pixel positions at which the second dot size has not yet been determined (hereinafter, "neighboring pixel group") among pixel positions around the pixel of interest from the cyan tone image. Neighboring pixels included in the neighboring pixel group are pixels each having a predetermined positional relationship with the pixel of interest. In the present embodiment, the neighboring pixel group includes two neighboring pixels 703 adjacent to the right side and underside of a pixel of interest 702 as illustrated in FIG. 10. Then, the provisional size changing part 465a changes the provisional second dot sizes in the neighboring pixel group on the basis of the difference between the provisional second dot size and the second dot size at the target pixel position (step S238).

For example, in the case where the provisional second dot size is the large size (the corresponding amount of ink is 9 pl) and the second dot size is the small size (3 pl), the amount of ink corresponding to the difference between the provisional second dot size and the second dot size is 9 3=6 pl. This amount of ink, i.e., 6 pl, is equally distributed to the two neighboring pixels 703. In other words, 3 pl is added to the amount of ink corresponding to the provisional second dot size of each neighboring pixel 703. This changes the size of the provisional second dot size of each neighboring pixel 703 by one size. For example, when the provisional second dot size before change is the zero size, the provisional second dot size is changed to the small size. When the provisional second dot size before change is the small size, the provisional second dot size is changed to the medium size. When the provisional second dot size before change is the medium size, the provisional second dot size is changed to the large size. Note that when the provisional second dot size is the large size, the provisional second dot size remains unchanged. In this case, the amount of ink that is not used to change the provisional second dot size may be used to change the provisional second dot size of the other neighboring pixel 703.

In the case where the provisional second dot size is the medium size (the corresponding amount of ink is 6 pl) and the second dot size is the small size (3 pl), the amount of ink corresponding to the difference between the provisional second dot size and the second dot size is 6 3=3 pl. This amount of ink, 3 pl, is equally distributed to the two neighboring pixels 703. In other words, 1.5 pl is added to the amount of ink corresponding to the provisional second dot size of each neighboring pixel 703. This amount of ink, 1.5 pl, corresponds to one half the differences in dot size (i.e., the difference between the large size and the medium size, the difference between the medium size and the small size, and the difference between the small size and the zero size), and therefore the amount of ink applied to each neighboring pixel 703 does not correspond to a dot size that can be represented by the image recording apparatus 1. In this case, for example, 3 pl may be added to the amount of ink corresponding to the provisional second dot size of each neighboring pixel 703 so as to increase the provisional second dot size of the neighboring pixel 703 by one size, and the extra 1.5 pl of ink added to each neighboring pixel 703 may be subtracted from pixels in the neighborhood of the neighboring pixel 703 when the neighboring pixel 703 is selected as a pixel of interest.

When the second dot size at the target pixel position has been determined and the provisional second dot sizes in the neighboring pixel group have been changed as necessary, the pixel of interest is changed to the next pixel in accordance with a predetermined processing order (see FIG. 11) of the pixel positions 751 (steps S239 and S240). The procedure then returns to step S234, and the processing of steps S234 to 238 is performed on the new pixel of interest. As illustrated in FIG. 11, the processing of steps S234 to S238 is performed in sequential order from a pixel position 751 at one end to a pixel position 751 at the other end in rows of the pixel positions 751 in the halftone image region 75. Alternatively, the processing of steps S234 to S238 may be performed in sequential order from a pixel position 751 at one end to a pixel position 751 at the other end in columns of the pixel positions 751 in the halftone image region 75.

The image recording apparatus according to the second embodiment repeats steps S234 to S240 under the control of the repetition control part 466 in FIG. 16 until the second dot sizes at all the pixel positions 751 corresponding to all the pixels in the cyan tone image are determined. Through this, the second halftone image data for use in recording a cyan image is generated.

The third halftone image data generation part 427 illustrated in FIG. 18 reads a magenta tone image from the image memory 421 and stores the pixel value of each pixel in the pixel value storage part 471 as in step S141 (step S241). Then, the provisional size determination part 472 performs halftone processing on the magenta tone image, which is the third color component image, (i.e., the magenta tone image is halftoned) by comparing the pixel value of each pixel in the magenta tone image with a threshold value in the matrix set for magenta, as in step S232. Through this, the sizes of a plurality of magenta dots to be formed at a plurality of pixel positions in the halftone image region are provisionally determined (step S242).

Next, one pixel in the magenta tone image is selected as a pixel of interest (step S243), and the dot size totaling part 473 acquires the first dot size and the second dot size at the target pixel position from the first halftone image data generation part 425 and the second halftone image data generation part 426. The dot size totaling part 473 then obtains a second total dot size that is the sum of the above first dot size, the above second dot size, and a provisional third dot size at the target pixel position, the provisional third dot size being the size of a magenta dot that has provisionally been determined in step S242 (step S244).

The size determination part 464 compares the second total dot size with a second threshold dot size that is stored in advance in the second threshold dot size storage part 477 (step S245). The comparison between the second total dot size and the second threshold dot size is performed by comparing the amounts of ink or halftone pixel values corresponding to both of the dot sizes, as in step S235.

When the second total dot size is less than or equal to the second threshold dot size, the third dot size, which is the size of a magenta dot to be formed at the target pixel position, is determined to be a size equal to the provisional third dot size by the size determination part 474 (step S246). When the second total dot size is greater than the second threshold dot size, the third dot size is determined to be the largest dot size within the range of the difference between the second threshold dot size and the sum of the first dot size and the second dot size, as in step S147 (step S247).

When it has been determined in step S245 that the second total dot size is greater than the second threshold dot size, step S247 is followed by a step of extracting a neighboring pixel group of pixels located at one or more pixel positions at which the third dot size has not yet been determined among pixel positions around the pixel of interest, from the magenta tone image. As described above, neighboring pixels included in the neighboring pixel group are pixels, each having a predetermined positional relationship with the pixel of interest. In the present embodiment, the neighboring pixel group includes two neighboring pixels 703 that are adjacent to the right side and underside of a pixel of interest 702, as illustrated in FIG. 10. Then, the provisional size changing part 475 changes the provisional third dot sizes in the neighboring pixel group on the basis of the difference between the provisional third dot size and the third dot size at the target pixel position, as in step S238 (step S248).

When the third dot size at the target pixel position has been determined and the provisional third dot sizes in the neighboring pixel group have been changed as necessary, the pixel of interest is changed to the next pixel in accordance with a predetermined processing order (FIG. 11) of the pixel positions 751 (steps S249 and S250). The procedure then returns to step S244, and the processing of steps S244 to S248 is performed on the next pixel of interest. As illustrated in FIG. 11, the processing of steps S244 to S248 is performed in sequential order from a pixel position 751 at one end to a pixel position 751 at the other end in rows of the pixel positions 751 in the halftone image region 75, similarly to steps S234 to S238. Alternatively, the processing of steps S244 to S248 may be performed in sequential order from a pixel position 751 at one end to a pixel position 751 at the other end in columns of the pixel positions 751 in the halftone image region 75.

The image recording apparatus according to the second embodiment repeats steps S244 to S250 under the control of the repetition control part 476 illustrated in FIG. 18 until the third dot sizes at the pixel positions 751 corresponding to all the pixels in the magenta tone image are determined. Through this, the third halftone image data for use in recording a magenta image is generated.

As described above, when generating the second halftone image data indicating the sizes of cyan (second color component) dots to be formed at the pixel positions in the halftone image region, the image recording apparatus according to the second embodiment performs halftone processing on the cyan tone image with reference to the first halftone image data indicating the sizes of black (first color component) dots, as in the first embodiment. By referencing the first halftone image data when generating the second halftone image data, the first total dot size, which is the sum of the black dot size (first dot size) and the cyan dot size (second dot size) to be formed at each pixel position, can be reduced to less than or equal to the predetermined first threshold dot size. This makes it possible to prevent black and cyan dots from excessively overlapping each other when cyan dots are formed during recording of images on the recording media 9. Consequently, poor color reproduction and cockling due to mixture of black and cyan inks can be suppressed.

When the cyan dot size that has provisionally been determined by comparison using the matrix set is changed in order to reduce the first total dot size to less than or equal to the first threshold dot size, the provisional second dot sizes in the neighboring pixel group located around the pixel of interest at which the dot size is changed are changed on the basis of the amount of change in the cyan dot size at the pixel of interest (i.e., the difference between the provisional second dot size and the second dot size). This makes it possible to correct the influence caused by the change in the cyan dot size and accurately represent the cyan tone image on the recording media 9.

When generating the third halftone image data indicating the sizes of magenta (third color component) dots, the image recording apparatus according to the second embodiment performs halftone processing on the magenta tone image with reference to the first halftone image data and the second halftone image data, as in the first embodiment. By referencing the first halftone image data and the second halftone image data when generating the third halftone image data, the second total dot size, which is the sum of the black dot size, the cyan dot size, and the magenta dot size (third dot size) to be formed at each pixel position, can be reduced to less than or equal to a predetermined second threshold dot size. This makes it possible to prevent black, cyan, and magenta dots from excessively overlapping one another during recording of images on the recording media 9. Consequently, poor color reproduction or cockling due to mixture of black, cyan, and magenta inks can be suppressed.

When the magenta dot size that has provisionally been determined by comparison using the matrix set is changed in order to make the second total dot size less than or equal to the second threshold dot size, the third provisional dot sizes in the neighboring pixel group located around the pixel of interest at which the dot size is changed are changed on the basis of the amount of change in the magenta dot size (i.e., the difference between the provisional third dot size and the third dot size). This makes it possible to correct the influence caused by the change in the magenta dot size and accurately represent the magenta tone image on the recording media 9.

As described above, the processing of steps S233 to S238 is performed in sequential order from a pixel position 751 at one end to a pixel position 751 at the other end in rows or columns of the pixel positions 751 in the halftone image region 75. Thus, the number of pixels at which the second dot size has not yet been determined around the pixel of interest can be made substantially constant, irrespective of the degree of progress of the processing (i.e., the position of the pixel of interest). Consequently, it is possible to maintain uniform quality of the processing of steps S234 to S238 over substantially the entire halftone image region. The same applies to steps S244 to S248. That is, uniform quality of the processing can be achieved over substantially the entire halftone image region.

The image recording apparatus according to the second embodiment may perform another step between steps S12 and step S13 as in the first embodiment. specifically, the step of reducing the first threshold dot size at pixel positions adjacent to a pixel position at which it is determined in step S12 that a black dot is formed (FIG. 14: step S121). This suppresses the formation of cyan dots at the pixel positions adjacent to the pixel position at which a black dot is formed, and even if cyan dots are formed, reduces the sizes of the cyan dots that are formed. Consequently, it is possible to prevent excessive overlapping of spread black dots and cyan dots on the recording media 9.

The image recording apparatus according to the second embodiment may also perform another step between steps S13 and step S14, specifically, the step of reducing the second threshold dot size at pixel positions adjacent to a pixel position where a black or cyan dot is determined to be formed. This suppresses the formation of magenta dots at the pixel positions adjacent to the pixel position at which a black or cyan dot is formed, and even if magenta dots are formed, reduces the sizes of the magenta dots that are formed. Consequently, it is possible to prevent excessive overlapping of spread black and cyan dots and magenta dots on the recording media 9.

Furthermore, as in the first embodiment, the image recording apparatus according to the second embodiment may perform another step between steps S12 and S13, specifically, the step of making the first threshold dot size at the pixel position at which it is determined in step S12 that a black dot is formed, equal to the size of that black dot (FIG. 15: step S122). Consequently, it is possible to prevent cyan dots from overlapping black dots and to improve color reproduction of images recorded on the recording media 9.

The image recording apparatus according to the second embodiment may also perform another step between steps S12 and step S14, specifically, the step of setting the second threshold dot size at a pixel position at which it is determined in step S12 that a black dot is formed, equal to the size of that black dot. Consequently, it is possible to prevent magenta dots from overlapping black dots and to further improve color reproduction of images recorded on the recording media 9.

While the above has been a description of embodiments of the present invention, the present invention is not intended to be limited to the embodiments described above and can be modified in various ways.

For example, the amounts of ink droplets corresponding to the large dot, the medium dot, and the small dot may be appropriately changed. Appropriate change can also be made to the characteristics of the matrix set illustrated in FIG. 4. The dot size of each color ink, excluding the zero size, does not necessarily have to be the three types of the large size, the medium size, and the small size, and may be one type, two types, or four or more types.

The first threshold dot size and the second threshold dot size stored in the image data generation part 423 may be appropriately changed. In the case of changing pixel values in the neighboring pixel group in step S138 or S148, a pixel value obtained by multiplying the aforementioned multiplication result by a coefficient (e.g., 0.8) may be equally distributed and added to each neighboring pixel 703. In the case of changing the provisional second dot sizes in the neighboring pixel group in step S238, a value obtained by multiplying the difference between the provisional second dot size and the second dot size by a coefficient (e.g., 0.8) may be equally distributed to each neighboring pixel 703. The same applies to the case of changing provisional third dot sizes in step S248.

While in the above-described embodiment, the neighboring pixels included in the neighboring pixel group are the two pixels adjacent to the right side and underside of the pixel of interest, various modification can be made to the positional relationship between the pixel of interest and the neighboring pixels. In addition, the amount of change in the pixel value of the neighboring pixels can be appropriately changed. For example, in step S138, neighboring pixels may be four pixels adjacent to the right, lower-right, bottom, and lower-left sides of the pixel of interest. In this case, for example, the pixel value of the pixel of interest 702 may be multiplied by a value obtained by dividing a difference between the provisional second dot size and the second dot size by the provisional second dot size, and seven-sixteenth of the above multiplication result may be added to the pixel value of the neighboring pixel that is adjacent to the right side of the pixel of interest. Also, one-sixteenth, five-sixteenth, and three-sixteenth of the above multiplication result may be respectively added to the pixel values of the neighboring pixels that are adjacent to the lower-right, bottom, and lower-left sides of the pixel of interest. The same applies to steps S148, S238, and S248. Neighboring pixels do not necessarily have to be adjacent to the pixel of interest and may be spaced from the pixel of interest as long as they are located at pixel positions around the pixel of interest.

When the pixel of interest is located at or near the edge of an image and some of neighboring pixels included in the neighboring pixel group are not present, in step S138 or S148, pixel values that were supposed to be added to the absent neighboring pixels among the pixel values to be distributed to the neighboring pixel group as a result of a change in the dot size may be distributed and added to the existing neighboring pixels. Alternatively, only some pixel values corresponding to the existing neighboring pixels among the pixel values to be distributed to the neighboring pixel group as a result of a change in the dot size may be added to the existing neighboring pixels. The same applies to step S238 and S248.

The processing order that indicates the order of pixel positions in which the processing of steps S133 to S138, S143 to S148, S234 to S238, or S244 to S248 is performed is not limited to the example illustrated in FIG. 11 and may be defined by, for example, the Peano curve or the Hilbelt curve.

The image data generation part 423 may reference the first halftone image data, the second halftone image data, and the third halftone image data when comparing the pixel value of each pixel in the yellow tone image with a threshold value in the matrix set for yellow in step S15, similarly to steps S13 and S14, to perform halftone processing on the yellow tone image and generate the fourth halftone image data.

The threshold matrices stored in the matrix storage part 422 may be for use in amplitude modulated (AM) screening in which tones are represented by changing the size of a cluster that is a group of regularly arranged dots. Steps S12 and S15 do not necessarily have to use a threshold-matrix method and, for example, may use error diffusion to perform halftone processing on the tone images to generate the first halftone image data and the fourth halftone image data.

Steps S133 and S143 also do not necessarily have to use a threshold-matrix method and, for example, may use error diffusion to perform halftone processing on the tone images to provisionally determine the sizes of dots to be formed at a target pixel position. Specifically, the pixel value of the pixel of interest and a predetermined threshold value that is set for a target pixel position are compared to provisionally determine the size of a dot to be formed at the target pixel position, and then a difference between the pixel value of the pixel of interest and a pixel value corresponding to the provisionally determined dot size is added to the pixel value of the next pixel of interest. In this case, also, the threshold values are changed during repetition of steps S133 to S138 or S143 to S148 so as to suppress the appearance of an unintentional regular pattern that accompanies the change in the dot size. Similarly, steps S232 and S242 also do not necessarily have to use a threshold-matrix method and, for example, may use error diffusion to perform halftone processing on the tone images and provisionally determine the sizes of dots.

The image data generation part 423 may reference the first halftone image data only when generating the second halftone image data indicating the sizes of cyan dots and generate the third halftone image data indicating the sizes of magenta dots without giving consideration to halftone image data for the other color components as in the case of generating the first halftone image data. This makes it possible to simplify the generation of the third halftone image data. Alternatively, assuming that the second color component is magenta and the third color component is cyan, the first halftone image data may be referenced only when generating the second halftone image data indicating the sizes of magenta dots. In other words, assuming that the first color component is black and the second color component is either cyan or magenta, the first halftone image data is referenced when at least the second halftone image data is generated. This makes it possible to prevent black dots and dots of the second color component from excessively overlapping each other and more accurately represent the tone image of the second color component.

In the image recording apparatus 1, the ink colors are not limited to black, cyan, magenta, and yellow, and the number of ink colors is also not limited to four. It is sufficient for the image recording apparatus 1 to record an image with at least two colors of ink, and various colors of ink may be used as ink of the first color component and ink of the second color component.

In the image recording apparatus 1, the operation of generating halftone image data and the operation of printing the halftone image data do not necessarily have to be performed in parallel, and if it is possible to provide a sufficiently large memory in the output control part 41, the image recording operation may be started after the generation of halftone image data regarding the entire color image is completed.

In the image recording apparatus 1, the ejection unit 3 may be moved in the Y direction by the movement mechanism 2 above the recording media 9 that are not moving, for example, as long as the recording media 9 travel in the Y direction relative to the ejection unit 3. The structure of the image recording apparatus 1 may be applied to, for example, image recording apparatuses for performing interlace printing and may be applied to image recording apparatuses for recording images on a long roll of paper. The recording media 9 may, for example, be films or thin metal plates rather than printing paper.

The image data generation part 423 may be used independently of the image recording apparatus 1 as an image data generation apparatus for generating halftone image data through halftone processing on a multi-tone color image. Also, the image data generation part 423 may be used in image recording apparatuses having other structures. For example, when the image data generation part 423 is used in an electrophotographic image recording apparatus, the sizes of dots determined by the image data generation part 423 correspond to the sizes of dots in a latent image recorded on a photo-conductive drum serving as a recording medium. In this case, a light emitting part for irradiating the photo-conductive drum with light to form a latent image serves as a dot output element, and a rotation mechanism for rotating the photo-conductive drum serves as a movement mechanism for moving the dot recording position relative to the recording medium.

The image data generation part 423 may be used in, for example, an image recording apparatus for recording an image on a lithographic plate for each color component serving as a recording medium by scanning the lithographic plate with light beams emitted from a light source part through a polygon mirror or the like. In this case, the light source part for emitting light beams serves as a dot output element, and the polygon mirror or the like serves as a movement mechanism for moving dot recording positions on the lithographic plate relative to the lithographic plate.

The configurations of the above-described embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2012-138137 filed in the Japan Patent Office on Jun. 19, 2012, the entire disclosure of which is incorporated herein by reference.

REFERENCE SIGNS LIST

1 Image recording apparatus
2 Movement mechanism
9 Recording medium
31 Head
33 Outlet
41 Output control part
70, 701 Tone image
75 Halftone image region
423 Image data generation part
425 First halftone image data generation part
426 Second halftone image data generation part
462, 472 Provisional size determination part
463, 473 Dot size totaling part
464, 474 Size determination part
465, 475 Pixel value changing part
465a, 475a Provisional size changing part
466, 476 Repetition control part
702 Pixel of interest
703 Neighboring pixel
751 Target pixel position
S11 to S21, S121, S122, S131 to S150, S231 to S250 Step

The invention claimed is:

1. An image data generation method of generating halftone image data through halftone processing on a multi-tone color image, comprising:
  a) generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and
  b) after said operation a), generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region,
  said operation b) including:
  b1) performing halftone processing on one pixel in said second color component image and provisionally determining a size of a dot of said second color component that is to be formed at a pixel position corresponding to said one pixel among said plurality of pixel positions;
  b2) obtaining a total dot size that is a sum of a first dot size and a provisional second dot size, said first dot size being a size of a dot of said first color component that is formed at said pixel position, and said provisional second dot size being the size of the dot of said second color component and being provisionally determined in said operation b1);
  b3) comparing said total dot size with a predetermined threshold dot size, and when said total dot size is less than or equal to said threshold dot size, determining a second dot size to be said provisional second dot size, said second dot size being the size of the dot of said second color component, and when said total dot size is greater than said threshold dot size, determining said second dot size to be a largest dot size within a range of a difference between said threshold dot size and said first dot size;
  b4) when said total dot size is greater than said threshold dot size in said operation b3), changing a pixel value of a group of neighboring pixels located at one or more pixel positions at which said second dot size has not yet been determined among pixel positions around said one pixel, on the basis of a pixel value of said one pixel and a difference between said provisional second dot size and said second dot size; and
  b5) changing said one pixel to a next pixel in accordance with a predetermined processing order of said plurality of pixel positions and repeating said operations b1) to b4).

2. The image data generation method according to claim 1, wherein
  said operations b1) to b4) are performed in sequential order from a pixel position at one end to a pixel position at the other end in a row or column of pixel positions in said halftone image region.

3. The image data generation method according to claim 1, wherein
  in said operation b1), said provisional second dot size is determined by comparing the pixel value of said one pixel with a threshold value that is set for said pixel position, and
  in said operation b), said threshold value is changed during repetition of said operations b1) to b4).

4. The image data generation method according to claim 1, further comprising:
  c) after said operation b), generating third halftone image data by performing halftone processing on a third color component image with reference to said first halftone image data and said second halftone image data, said third color component image being an image of a third color component of said color image, and said third color component image indicating sizes of a plurality of dots of said third color component that are respectively to be formed at said plurality of pixel positions in said halftone image region,
  said operation c) including:
  c1) performing halftone processing on one pixel in said third color component image and provisionally determining a size of a dot of said third color component that is to be formed at a pixel position corresponding to said one pixel among said plurality of pixel positions;

c2) obtaining another total dot size that is a sum of said first dot size, said second dot size, and a provisional third dot size at said pixel position, said provisional third dot size being the size of the dot of said third color component and being provisionally determined in said operation c1);

c3) comparing said other total dot size with another threshold dot size, and when said other total dot size is less than or equal to said other threshold dot size, determining a third dot size to be said provisional third dot size, said third dot size being the size of the dot of said third color component, and when said other total dot size is greater than said other threshold dot size, determining said third dot size to be a largest dot size within a range of a difference between said other threshold dot size and a sum of said first dot size and said second dot size as said third dot size;

c4) when said other total dot size is greater than said other threshold dot size in said operation c3), changing a pixel value of a group of neighboring pixels located at one or more pixel positions at which said third dot size has not yet been determined among pixel positions around said one pixel, on the basis of a pixel value of said one pixel and a difference between said provisional third dot size and said third dot size; and c5) changing said one pixel to a next pixel in accordance with a predetermined processing order of said plurality of pixel positions and repeating said operations c1) to c4).

5. The image data generation method according to claim 1, wherein
said first dot size is one of a large size, an intermediate size smaller than the large size, and a zero size that indicates absence of a dot, and
said second dot size is one of the large size, the intermediate size, and the zero size.

6. The image data generation method according to claim 1, wherein
said first color component is black.

7. The image data generation method according to claim 6, further comprising:
between said operations a) and b), setting said threshold dot size of a pixel position at which a dot of said first color component is determined to be formed in said operation a), to be the size of the dot of said first color component.

8. The image data generation method according to claim 1, further comprising:
prior to said operation a), generating a black image, a cyan image, a magenta image, and a yellow image by performing separation processing along with gray-component replacement on said color image.

9. The image data generation method according to claim 1, further comprising:
between said operations a) and b), reducing said threshold dot size at a pixel position that is adjacent to a pixel position at which a dot of said first color component is determined to be formed in said operation a).

10. An image data generation method of generating halftone image data through halftone processing on a multi-tone color image, comprising:
a) generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and b) after said operation a), generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region, said operation b) including:

b1) performing halftone processing on said second color component image and provisionally determining sizes of a plurality of dots of said second color component that are respectively to be formed at said plurality of positions in said halftone image region;

b2) obtaining a total dot size that is a sum of a first dot size and a provisional second dot size, the first dot size being a size of a dot of said first color component that is formed at a pixel position corresponding to one pixel in said second color component image among said plurality of pixel positions, and said provisional second dot size being a size of a dot of said second color component that is to be formed at said pixel position and being provisionally determined in said operation b1);

b3) comparing said total dot size with a predetermined threshold dot size, and when said total dot size is less than or equal to said threshold dot size, determining a second dot size to be said provisional second dot size, said second dot size being the size of the dot of said second color component, and when said total dot size is greater than said threshold dot size, determining said second dot size to be a largest dot size within a range of a difference between said threshold dot size and said first dot size;

b4) when said total dot size is greater than said threshold dot size in said operation b3) changing a provisional second dot size of a group of neighboring pixels that are located at one or more pixel positions at which said second dot size has not yet been determined among pixel positions around said one pixel, on the basis of a difference between said provisional second dot size and said second dot size at said one pixel; and b5) changing said one pixel to a next pixel in accordance with a predetermined processing order of said plurality of pixel positions and repeating said operations b2) to b4).

11. The image data generation method according to claim 10, wherein
said operations b2) to b4) are performed in sequential order from a pixel position at one end to a pixel position at the other end in a row or column of pixel positions in said halftone image region.

12. The image data generation method according to claim 10, further comprising:
c) after said operation b), generating third halftone image data by performing halftone processing on a third color component image with reference to said first halftone image data and said second halftone image data, said third color component image being an image of a third color component of said color image, and said third color component image indicating sizes of a plurality of dots of said third color component that are respectively to be formed at said plurality of pixel positions in said halftone image region, said operation c) including:
c1) performing halftone processing on said third color component image and provisionally determining sizes of said plurality of dots of said third color component that are respectively to be formed at said plurality of pixel positions in said halftone image region;
c2) obtaining another total dot size that is a sum of said first dot size, said second dot size, and a provisional third dot size at a pixel position corresponding to one pixel in said third color component image among said plurality of pixel positions, said provisional third dot size being the size of the dot of said third color component that is to be formed at said pixel position and being provisionally determined in said operation c1);
c3) comparing said other total dot size with another threshold dot size, and when said other total dot size is less than or equal to said other threshold dot size, determining a third dot size to be said provisional third dot size, said third dot size being a size of a dot of said third color component, and when said other total dot size is greater than said other threshold dot size, determining said third dot size to be a largest dot size within a range of a difference between said other threshold dot size and a sum of said first dot size and said second dot size;
c4) when said other total dot size is greater than said other threshold dot size in said operation c3), changing a provisional third dot size of a group of neighboring pixels located at one or more pixel positions at which said third dot size has not yet been determined among pixel positions around said one pixel, on the basis of a difference between said provisional third dot size and said third dot size at said one pixel; and
c5) changing said one pixel to a next pixel in accordance with a predetermined processing order of said plurality of pixel positions and repeating said operations c2) to c4).

13. The image data generation method according to claim 10, wherein
said first dot size is one of a large size, an intermediate size smaller than the large size, and a zero size that indicates absence of a dot, and
said second dot size is one of the large size, the intermediate size, and the zero size.

14. The image data generation method according to claim 10, wherein
said first color component is black.

15. The image data generation method according to claim 14, further comprising:
between said operations a) and b), setting said threshold dot size of a pixel position at which a dot of said first color component is determined to be formed in said operation a), to be the size of the dot of said first color component.

16. The image data generation method according to claim 10, further comprising:
prior to said operation a), generating a black image, a cyan image, a magenta image, and a yellow image by performing separation processing along with gray-component replacement on said color image.

17. The image data generation method according to claim 10, further comprising:
between said operations a) and b), reducing said threshold dot size at a pixel position that is adjacent to a pixel position at which a dot of said first color component is determined to be formed in said operation a).

18. An image recording method of recording an image onto a recording medium, comprising:
preparing first halftone image data and second halftone image data that are generated using a predetermined image data generation method;
recording a dot on a recording medium on the basis of said first halftone image data; and
recording a dot on a recording medium on the basis of said second halftone image data,
said image data generation method including:
a) generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and
b) after said operation a), generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region,
said operation b) including:
b1) performing halftone processing on one pixel in said second color component image and provisionally determining a size of a dot of said second color component that is to be formed at a pixel position corresponding to said one pixel among said plurality of pixel positions;
b2) obtaining a total dot size that is a sum of a first dot size and a provisional second dot size, said first dot size being a size of a dot of said first color component that is formed at said pixel position, and said provisional second dot size being the size of the dot of said second color component and being provisionally determined in said operation b1);
b3) comparing said total dot size with a predetermined threshold dot size, and when said total dot size is less than or equal to said threshold dot size, determining a second dot size to be said provisional second dot size, said second dot size being the size of the dot of said second color component, and when said total dot size is greater than said threshold dot size, determining said second dot size to be a largest dot size within a range of a difference between said threshold dot size and said first dot size;
b4) when said total dot size is greater than said threshold dot size in said operation b3), changing a pixel value of a group of neighboring pixels located at one or more pixel positions at which said second dot size has not yet been determined among pixel positions around said one pixel, on the basis of a pixel value of said one pixel and a difference between said provisional second dot size and said second dot size; and
b5) changing said one pixel to a next pixel in accordance with a predetermined processing order of said plurality of pixel positions and repeating said operations b1) to b4).

19. An image recording method of recording an image onto a recording medium, comprising:
preparing first halftone image data and second halftone image data that are generated using a predetermined image data generation method;

recording a dot on a recording medium on the basis of said first halftone image data; and recording a dot on a recording medium on the basis of said second halftone image data, said image data generation method including:

a) generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and b) after said operation a), generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region, said operation b) including:

b1) performing halftone processing on said second color component image and provisionally determining sizes of a plurality of dots of said second color component that are respectively to be formed at said plurality of positions in said halftone image region;

b2) obtaining a total dot size that is a sum of a first dot size and a provisional second dot size, the first dot size being a size of a dot of said first color component that is formed at a pixel position corresponding to one pixel in said second color component image among said plurality of pixel positions, and said provisional second dot size being a size of a dot of said second color component that is to be formed at said pixel position and being provisionally determined in said operation b1);

b3) comparing said total dot size with a predetermined threshold dot size, and when said total dot size is less than or equal to said threshold dot size, determining a second dot size to be said provisional second dot size, said second dot size being the size of the dot of said second color component, and when said total dot size is greater than said threshold dot size, determining said second dot size to be a largest dot size within a range of a difference between said threshold dot size and said first dot size;

b4) when said total dot size is greater than said threshold dot size in said operation b3), changing a provisional second dot size of a group of neighboring pixels that are located at one or more pixel positions at which said second dot size has not yet been determined among pixel positions around said one pixel, on the basis of a difference between said provisional second dot size and said second dot size at said one pixel; and b5) changing said one pixel to a next pixel in accordance with a predetermined processing order of said plurality of pixel positions and repeating said operations b2) to b4).

20. An image data generation apparatus for generating halftone image data through halftone processing on a multi-tone color image, comprising:

a first halftone image data generation part for generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and a second halftone image data generation part for, after said first halftone image data is generated, generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region, said second halftone image data generation part including:

a provisional size determination part for performing halftone processing on one pixel in said second color component image and provisionally determining a size of a dot of said second color component that is to be formed at a pixel position corresponding to said one pixel among said plurality of pixel positions;

a dot size totaling part for obtaining a total dot size that is a sum of a first dot size and a provisional second dot size, said first dot size being a size of a dot of said first color component that is formed at said pixel position, and said provisional second dot size being the size of the dot of said second color component and being provisionally determined by said provisional size determination part;

a size determination part for comparing said total dot size with a predetermined threshold dot size, and when said total dot size is less than or equal to said threshold dot size, determining a second dot size to be said provisional second dot size, said second dot size being a size of a dot of said second color component, and when said total dot size is greater than said threshold dot size, determining said second dot sizes to be a largest dot size within a range of a difference between said threshold dot size and said first dot size as said second dot size;

a pixel value changing part for, when said total dot size is greater than said threshold dot size, changing a pixel value of a group of neighboring pixels located at one or more pixel positions at which said second dot size has not yet been determined among pixel positions around said one pixel, on the basis of a pixel value of said one pixel and a difference between said provisional second dot size and said second dot size; and a repetition control part for changing said one pixel to a next pixel in accordance with a predetermined processing order of said plurality of pixel positions and repeating determination of said provisional second dot size by said provisional size determination part, calculation of said total dot size by said dot size totaling part, determination of said second dot size by said size determination part, and changing of the pixel value by said pixel value changing part.

21. An image data generation apparatus for generating halftone image data through halftone processing on a multi-tone color image, comprising:

a first halftone image data generation part for generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and a second halftone image data generation part for, after said first halftone image data is generated, generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region, said second halftone image data generation part including:

a provisional size determination part for performing halftone processing on said second color component image and provisionally determining the sizes of said plurality of dots of said second color component that are respectively to be formed at said plurality of pixel positions in said halftone image region;

a dot size totaling part for obtaining a total dot size that is a sum of a first dot size and a provisional second dot size, said first dot size being a size of a dot of said first color component that is formed at a pixel position corresponding to one pixel in said second color component image among said plurality of pixel positions, and said provisional second dot size being a size of a dot of said second color component that is to be formed at said pixel position and being provisionally determined by said provisional size determination part;

a size determination part for comparing said total dot size with a predetermined threshold dot size, and when said total dot size is less than or equal to said threshold dot size, determining a second dot size to be said provisional second dot size, said second dot size being is the size of the dot of said second color component, and when said total dot size is greater than said threshold dot size, determining said second dot size to be a largest dot size within a range of a difference between said threshold dot size and said first dot size as said second dot size;

a provisional size changing part for, when said total dot size is greater than said threshold dot size, changing a second provision dot size of a group of neighboring pixels located at one or more pixel positions at which said second dot size has not yet been determined among pixel positions around said one pixel, on the basis of a difference between said provisional second dot size and said second dot size at said one pixel; and a repetition control part for changing said one pixel to a next pixel in accordance with a predetermined processing order of said plurality of pixel positions and repeating determination of said provisional second dot size by said provisional size determination part, calculation of said total dot size by said dot size totaling part, determination of said second dot size by said size determination part, and changing of said provisional second dot size by said provisional size changing part.

22. An image recording apparatus for recording an image onto a recording medium, comprising:

an image data generation apparatus;

a dot output element for recording a dot at a dot recording position of a recording medium;

a movement mechanism for moving said dot recording position of said recording medium relative to said recording medium; and an output control part for controlling output of said dot output element on the basis of first halftone image data and second halftone image data in parallel with movement of said dot recording position of said recording medium relative to said recording medium, said image data generation apparatus including:

a first halftone image data generation part for generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and a second halftone image data generation part for, after said first halftone image data is generated, generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region, said second halftone image data generation part including:

a provisional size determination part for performing halftone processing on one pixel in said second color component image and provisionally determining a size of a dot of said second color component that is to be formed at a pixel position corresponding to said one pixel among said plurality of pixel positions;

a dot size totaling part for obtaining a total dot size that is a sum of a first dot size and a provisional second dot size, said first dot size being a size of a dot of said first color component that is formed at said pixel position, and said provisional second dot size being the size of the dot of said second color component and being provisionally determined by said provisional size determination part;

a size determination part for comparing said total dot size with a predetermined threshold dot size, and when said total dot size is less than or equal to said threshold dot size, determining a second dot size to be said provisional second dot size, said second dot size being a size of a dot of said second color component, and when said total dot size is greater than said threshold dot size, determining said second dot sizes to be a largest dot size within a range of a difference between said threshold dot size and said first dot size as said second dot size;

a pixel value changing part for, when said total dot size is greater than said threshold dot size, changing a pixel value of a group of neighboring pixels located at one or more pixel positions at which said second dot size has not yet been determined among pixel positions around said one pixel, on the basis of a pixel value of said one pixel and a difference between said provisional second dot size and said second dot size; and a repetition control part for changing said one pixel to a next pixel in accordance with a predetermined processing order of said plurality of pixel positions and repeating determination of said provisional second dot size by said provisional size determination part, calculation of said total dot size by said dot size totaling part, determination of said second dot size by said size determination part, and changing of the pixel value by said pixel value changing part.

23. The image recording apparatus according to claim 22, wherein said dot output element includes:

a first ejection part for ejecting a fine droplet of ink of said first color component onto said dot recording position of said recording medium to record a dot of said first color component, said first ejection part being controlled in accordance with said first halftone image data by said output control part; and a second ejection part for ejecting a fine droplet of ink of said second color component onto said dot recording position of said recording medium to record a dot of said second color component, said second ejection part being controlled in accordance with said second halftone image data by said output control part.

24. An image recording apparatus for recording an image onto a recording medium, comprising:
an image data generation apparatus;
a dot output element for recording a dot at a dot recording position of a recording medium;
a movement mechanism for moving said dot recording position of said recording medium relative to said recording medium; and
an output control part for controlling output of said dot output element on the basis of first halftone image data and second halftone image data in parallel with movement of said dot recording position of said recording medium relative to said recording medium,
said image data generation apparatus including:
a first halftone image data generation part for generating first halftone image data by performing halftone processing on a first color component image that is an image of a first color component of said color image, said first halftone image data indicating sizes of a plurality of dots of said first color component that are respectively to be formed at a plurality of pixel positions arranged in a matrix in a halftone image region; and
a second halftone image data generation part for, after said first halftone image data is generated, generating second halftone image data by performing halftone processing on a second color component image with reference to said first halftone image data, said second color component image being an image of a second color component of said color image, and said second halftone image data indicating sizes of a plurality of dots of said second color component that are respectively to be formed at said plurality of pixel positions in said halftone image region,
said second halftone image data generation part including:
a provisional size determination part for performing halftone processing on said second color component image and provisionally determining the sizes of said plurality of dots of said second color component that are respectively to be formed at said plurality of pixel positions in said halftone image region;
a dot size totaling part for obtaining a total dot size that is a sum of a first dot size and a provisional second dot size, said first dot size being a size of a dot of said first color component that is formed at a pixel position corresponding to one pixel in said second color component image among said plurality of pixel positions, and said provisional second dot size being a size of a dot of said second color component that is to be formed at said pixel position and being provisionally determined by said provisional size determination part;
a size determination part for comparing said total dot size with a predetermined threshold dot size, and when said total dot size is less than or equal to said threshold dot size, determining a second dot size to be said provisional second dot size, said second dot size being is the size of the dot of said second color component, and when said total dot size is greater than said threshold dot size, determining said second dot size to be a largest dot size within a range of a difference between said threshold dot size and said first dot size as said second dot size;
a provisional size changing part for, when said total dot size is greater than said threshold dot size, changing a second provision dot size of a group of neighboring pixels located at one or more pixel positions at which said second dot size has not yet been determined among pixel positions around said one pixel, on the basis of a difference between said provisional second dot size and said second dot size at said one pixel; and
a repetition control part for changing said one pixel to a next pixel in accordance with a predetermined processing order of said plurality of pixel positions and repeating determination of said provisional second dot size by said provisional size determination part, calculation of said total dot size by said dot size totaling part, determination of said second dot size by said size determination part, and changing of said provisional second dot size by said provisional size changing part.

25. The image recording apparatus according to claim 24, wherein
said dot output element includes:
a first ejection part for ejecting a fine droplet of ink of said first color component onto said dot recording position of said recording medium to record a dot of said first color component, said first ejection part being controlled in accordance with said first halftone image data by said output control part; and
a second ejection part for ejecting a fine droplet of ink of said second color component onto said dot recording position of said recording medium to record a dot of said second color component, said second ejection part being controlled in accordance with said second halftone image data by said output control part.

* * * * *